(12) United States Patent
Wu et al.

(10) Patent No.: US 11,530,731 B2
(45) Date of Patent: Dec. 20, 2022

(54) MECHANICAL METAMATERIALS AS AN ENERGY SHIELD

(71) Applicants: ARIZONA BOARD OF REGENTS ON BEHALF OF ARIZONA STATE UNIVERSITY, Scottsdale, AZ (US); WUYI UNIVERSITY, Guangdong (CN); ZHEJIANG UNIVERSITY, Hangzhou (CN)

(72) Inventors: Lingling Wu, Tempe, AZ (US); Hanqing Jiang, Chandler, AZ (US); Yong Wang, Hangzhou (CN); Qianxuan Wang, Guangdong (CN)

(73) Assignees: ARIZONA BOARD OF REGENTS ON BEHALF OF ARIZONA STATE UNIVERSITY, Scottsdale, AZ (US); WUYI UNIVERSITY, Guangdong (CN); ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/620,319

(22) PCT Filed: Jun. 25, 2020

(86) PCT No.: PCT/US2020/039597
§ 371 (c)(1),
(2) Date: Dec. 17, 2021

(87) PCT Pub. No.: WO2020/264146
PCT Pub. Date: Dec. 30, 2020

(65) Prior Publication Data
US 2022/0205508 A1 Jun. 30, 2022

Related U.S. Application Data

(60) Provisional application No. 62/866,451, filed on Jun. 25, 2019.

(51) Int. Cl.
*F16F 15/04* (2006.01)
*G10K 11/162* (2006.01)

(52) U.S. Cl.
CPC ............ *F16F 15/04* (2013.01); *G10K 11/162* (2013.01); *F16F 2224/02* (2013.01); *F16F 2228/063* (2013.01)

(58) Field of Classification Search
CPC .. F16F 15/04; F16F 2224/02; F16F 2228/063; G10K 11/162
See application file for complete search history.

(56) References Cited

U.S. PATENT DOCUMENTS

| 10,808,794 B1 * | 10/2020 | Boyce ................. F16F 7/08 |
| 2016/0027427 A1 | 1/2016 | Yang et al. |
| 2018/0348025 A1 | 12/2018 | Jahromi et al. |

FOREIGN PATENT DOCUMENTS

| CN | 107654567 A | 2/2018 |
| CN | 108799405 A * | 11/2018 ............ F16F 15/04 |
| WO | 2018189719 A1 | 10/2018 |

OTHER PUBLICATIONS

International Search Report and Written Opinion for Application No. PCT/US2020/039597 dated Sep. 25, 2020 (8 pages).

(Continued)

*Primary Examiner* — Xuan Lan Nguyen
(74) *Attorney, Agent, or Firm* — Michael Best & Friedrich LLP

(57) ABSTRACT

A metamaterial system for protecting a payload from external energy flux generated by an energy source includes a mechanical, metamaterial framework configured to circulate the external energy flux between the metamaterial system and the energy source.

21 Claims, 20 Drawing Sheets

(56) References Cited

OTHER PUBLICATIONS

Chronopoulos et al., "Enhanced acoustic insulation properties of composite metamaterials having embedded negative stiffness inclusions," Extreme Mechanics Letters 12 (2017) 48-54.
Zhang et al. "Tensegrity cell mechanical metamaterial with metal rubber," Applied Physics Letters 113, 031906 (2018).
Tang et al. "Hybrid acoustic metamaterial as super absorber for broadband low-frequency sound"; Scientific Reports 7:43340; (2017).
Fang, H. et al. Programmable Self-Locking Origami Mechanical Metamaterials. Advanced Materials 30, 1706311 (2018).
Farley, CT et al. Mechanism of leg stiffness adjustment for hopping on surfaces of different stiffnesses. Journal of applied physiology 85, 1044-1055 (1998).
Ferris, DP et al. Runners adjust leg stiffness for their first step on a new running surface. Journal of biomechanics 32, 787-794 (1999).
Filipov, E. T., et al. Origami tubes assembled into stiff, yet reconfigurable structures and metamaterials. Proceedings of the National Academy of Sciences of the United States of America 112, 12321-12326, (2015).
Ge, Q., et al. Active origami by 4D printing. Smart Materials and Structures 23, (2014).
Guest, S. D. et al. The Folding of Triangulated Cylinders .1. Geometric Considerations. Journal of Applied Mechanics—Transactions of the Asme 61, 773-777, (1994).
Haghpanah, B. et al. Multistable shape-reconfigurable architected materials. Advanced Materials 28, 7915-7920 (2016).
Hawkes, E. et al. Programmable matter by folding. Proceedings of the National Academy of Sciences of the United States of America 107, 12441-12445, (2010).
Hewage, T.A. et al. Double-Negative Mechanical Metamaterials Displaying Simultaneous Negative Stiffness and Negative Poisson's Ratio Properties. Advanced Materials 28, 10323-10332 (2016).
Hunt, G. W. et al. Twist buckling and the foldable cylinder an exercise in origami. International Journal of Non-Linear Mechanics 40, 833-843, (2005).
Ibrahim R., Recent advances in nonlinear passive vibration isolators. Journal of sound and vibration 314, 371-452 (2008).
Janbaz, S. et al. Ultra-programmable buckling-driven soft cellular mechanisms. Materials Horizons 6, 1138-1147 (2019).
Jianguo, C. et al. Bistable Behavior of the Cylindrical Origami Structure With Kresling Pattern. Journal of Mechanical Design 137 (2015).
Jin L. et al. Guided transition waves in multistable mechanical metamaterials. Proceedings of the National Academy of Sciences 117, 2319-2325 (2020).
Judy, J. W. et al. Magnetically actuated, addressable microstructures. Journal of Microelectromechanical Systems 6, 249-256, (1997).
Kim, J., et al. Designing Responsive Buckled Surfaces by Halftone Gel Lithography. Science 335, 1201-1205, (2012).
Kim, J., et al. Thermally responsive rolling of thin gel strips with discrete variations in swelling. Soft Matter 8, 2375-2381, (2012).
Kim, S. et al. Soft robotics: a bioinspired evolution in robotics. Trends in biotechnology 31, 287-294 (2013).
Kuder, I.K. et al. Variable stiffness material and structural concepts for morphing applications. Progress in Aerospace Sciences 63, 33-55 (2013).
Kuribayashi, K. et al. Self-deployable origami stent grafts as a biomedical application of Ni-rich TiNi shape memory alloy foil. Materials Science and Engineering a—Structural Materials Properties Microstructure and Processing 419, 131-137, (2006).
Lee, T.U. et al. (2018) Curved-Crease Origami with Multiple States, in Origami 7: Seventh International Meeting of Origami Science, Mathematics, and Education, pp. 849-864.
Leong, T. G. et al. Tetherless thermobiochemically actuated microgrippers. Proceedings of the National Academy of Sciences of the United States of America 106, 703-708, (2009).
Li, S. et al. Recoverable and programmable collapse from folding pressurized origami cellular solids. Physical review letters 117, 114301 (2016).
Lin, C.-H. et al. Highly Deformable Origami Paper Photodetector Arrays. ACS Nano, (2017).
Liu, K. et al. Invariant and smooth limit of discrete geometry folded from bistable origami leading to multistable metasurfaces. Nature Communications 10, 4238 (2019).
Liu, Y., et al. Self-folding of polymer sheets using local light absorption. Soft Matter 8, 1764-1769, (2012).
Lv, C. et al. Origami based mechanical metamaterials. Scientific reports 4, 5979 (2014).
Maloiy, G. et al. Energetic cost of carrying loads: have African women discovered an economic way? Nature 319, 668-669 (1986).
Martinez, R. V., et al. Elastomeric Origami: Programmable Paper-Elastomer Composites as Pneumatic Actuators. Advanced Functional Materials 22, 1376-1384, (2012).
Miura, K. Method of packaging and deployment of large membranes in space. (Institute of Space and Astronomical Sciences, 1985).
Mu, X. M. et al. Photo-induced bending in a light-activated polymer laminated composite. Soft Matter 11, 2673-2682, (2015).
Na, J.-H. et al. Programming Reversibly Self-Folding Origami with Micropatterned Photo-Crosslinkable Polymer Trilayers. Advanced Materials 27, 79-85, (2015).
Nelson, BJ et al. Microrobots for minimally invasive medicine. Annual review of biomedical engineering 12, 55-85 (2010).
Noel, AC et al. Frogs use a viscoelastic tongue and non-Newtonian saliva to catch prey. Journal of the Royal Society Interface 14, 20160764 (2017).
Overvelde, J. T. B. et al. A three-dimensional actuated origami-inspired transformable metamaterial with multiple degrees of freedom. Nature Communications 7, (2016).
Overvelde, JTB et al. Amplifying the response of soft actuators by harnessing snap-through instabilities. Proceedings of the National Academy of Sciences 112, 10863-10868 (2015).
Pu H. et al., Multi-layer electromagnetic spring with tunable negative stiffness for semi-active vibration isolation. Mechanical Systems and Signal Processing 121, 942-960 (2019).
Ryu, J. et al. Photo-origami-Bending and folding polymers with light. Applied Physics Letters 100, (2012).
Sharp, R. et al. An evaluation of passive automotive suspension systems with variable stiffness and damping parameters. Vehicle System Dynamics 15, 335-350 (1986).
Silverberg JL et al., Using origami design principles to fold reprogrammable mechanical metamaterials. science 345, 647-650 (2014).
Silverberg, J. L. et al. Origami structures with a critical transition to bistability arising from hidden degrees of freedom. Nature Materials 14, 389-393, (2015).
Song, Z. et al. Microscale Silicon Origami. Small 12, 5401-5406, (2016).
Thrall, A. P. et al. Accordion shelters: A historical review of origami-like deployable shelters developed by the US military. Engineering Structures 59, 686-692, (2014).
Tu, M. et al. The control of wing kinematics by two steering muscles of the blowfly (Calliphora vicina). Journal of Comparative Physiology A 178, 813-830 (1996).
Wang, Z. et al. Origami-Based Reconfigurable Metamaterials for Tunable Chirality. Advanced Materials 29, 1700412, (2017).
Wei Y. et al., A novel, variable stiffness robotic gripper based on integrated soft actuating and particle jamming. Soft Robotics 3, 134-143 (2016).
Xu, S. et al. Assembly of micro/nanomaterials into complex, three-dimensional architectures by compressive buckling. Science 347, 154-159, (2015).
Yan Z. et al., Controlled Mechanical Buckling for Origami-Inspired Construction of 3D Microstructures in Advanced Materials Advanced Functional Materials 26, 2629-2639 (2016).
Yasuda, H., et al. Folding behaviour of Tachi-Miura polyhedron bellows. Proceedings of the Royal Society a—Mathematical Physical and Engineering Sciences 469, (2013).
Yi, Y. W. et al. Magnetic actuation of hinged microstructures. Journal of Microelectromechanical Systems 8, 10-17, (1999).
Yokoyama, T., et al. Tensile Stress-strain Properties of Paper and Paperboard and Their Constitutive Equations. Journal of the Japanese Society for Experimental Mechanics 7, s68-s73, (2007).

(56) References Cited

OTHER PUBLICATIONS

Zhai, Z. et al., Origami-inspired, on-demand deployable and collapsible mechanical metamaterials with tunable stiffness. Proceedings of the National Academy of Sciences 115, 2032-2037 (2018).
Zhang Y. et al., Printing, folding and assembly methods for forming 3D mesostructures in advanced materials. Nature Reviews Materials 2, 1-17 (2017).
Berger, J. et al. Mechanical metamaterials at the theoretical limit of isotropic elastic stiffness. Nature 543, 533-537 (2017).
Boatti, E. et al. Origami metamaterials for tunable thermal expansion. Advanced Materials 29, 1700360 (2017).
Bolmin O. et al. (2017) Pop! Observing and Modeling the Legless Self-righting Jumping Mechanism of Click Beetles. in Conference on Biomimetic and Biohybrid Systems (Springer), pp. 35-47.
Borodulina, S., et al. Stress-strain curve of paper revisited. Nordic Pulp and Paper Research Journal 27, 318 (2012).
Carrella, A. et al. Static analysis of a passive vibration isolator with quasi-zero-sliffness characteristic. Journal of sound and vibration 301, 678-689 (2007).
Chen, T. et al. Harnessing bistability for directional propulsion of soft, untethered robots. Proceedings of the National Academy of Sciences 115, 5698-5702 (2018).
Collins, S. et al. Efficient bipedal robots based on passive-dynamic walkers. Science 307, 1082-1085 (2005).
Dahiya, A. et al. (2017) Efficiently tunable positive-negative stiffness actuator, in 2017 IEEE International Conference on Robotics and Automation (ICRA) (IEEE), pp. 1235-1240.
Dias, M.A. et al. Geometric mechanics of curved crease origami. Physical review letters 109, 114301 (2012).
Dudte, L. H., et al. Programming curvature using origami tessellations. Nature Materials 15, 583-+, (2016).
Faber, J.A. et al. Bioinspired spring origami. Science 359, 1386-1391 (2018).

\* cited by examiner

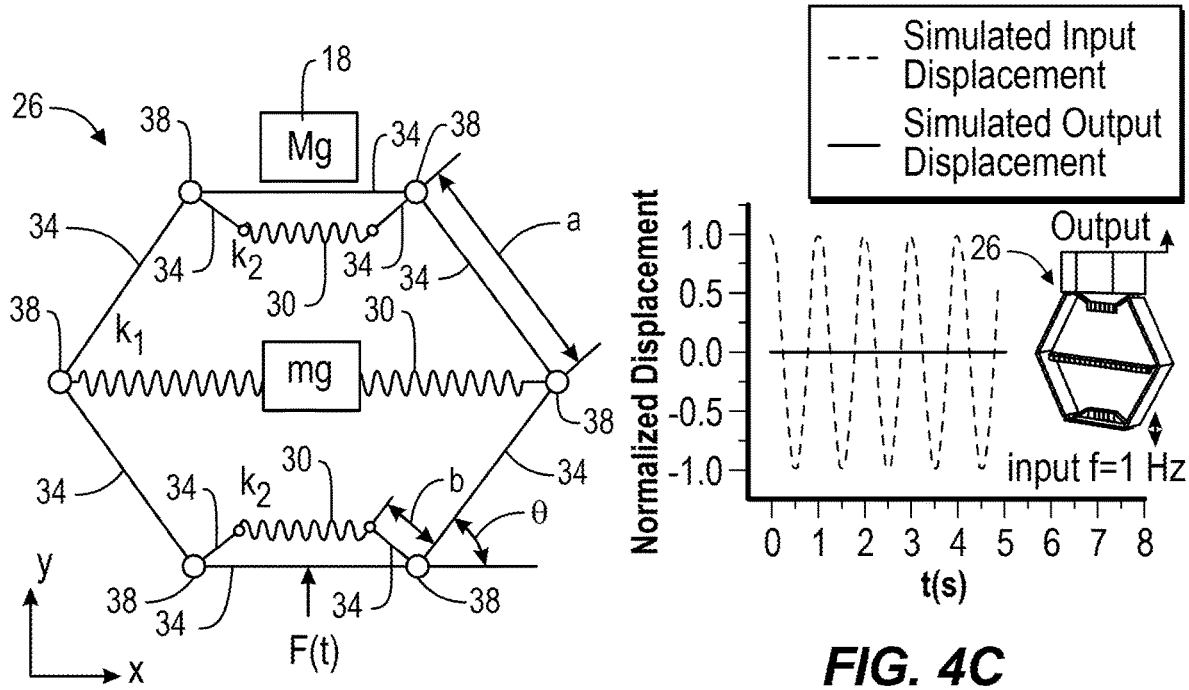
FIG. 4B
FIG. 4C
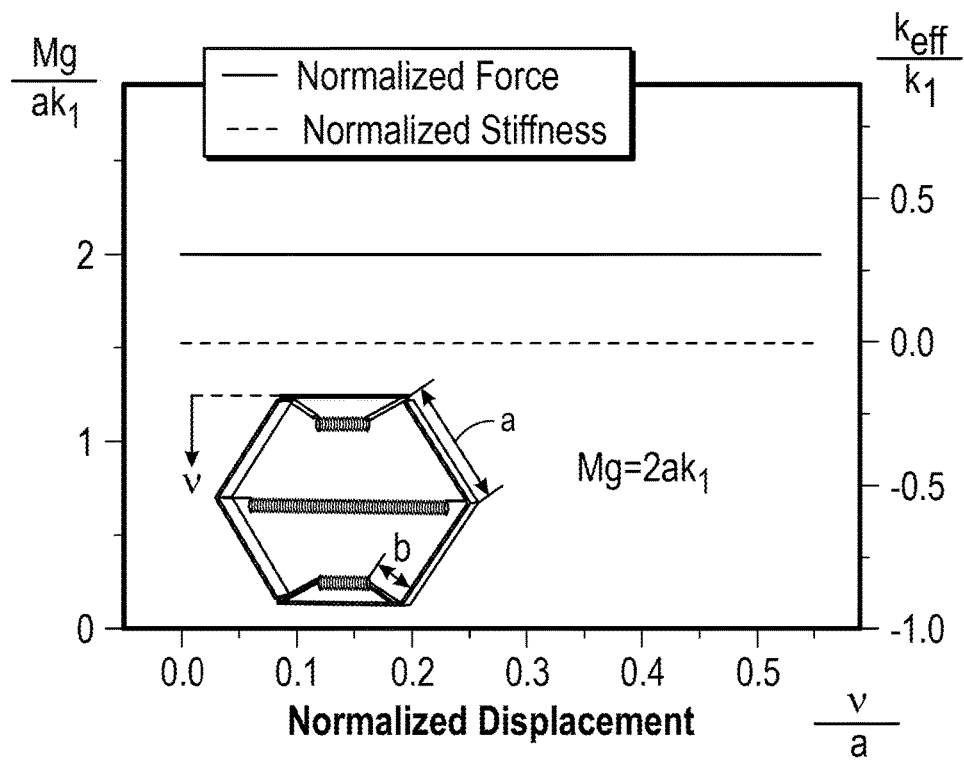
FIG. 5

Zero Gravitational Potential Energy Position

MECHANICAL METAMATERIALS AS AN ENERGY SHIELD

CROSS-REFERENCE TO RELATED APPLICATIONS

This application claims priority to U.S. Provisional Application No. 62/866,451, filed Jun. 25, 2019, the entire contents of which are incorporated herein by reference.

TECHNICAL FIELD

The present disclosure relates to a new mechanism for isolating full band frequency vibrations by circulating energy flux between the system and energy source. More particularly, the present disclosure relates to a mechanical metamaterial that can isolate vibrations in full band frequency based on the absolute zero stiffness characteristic of an artificial element.

BACKGROUND

Recent advances are rapidly evolving the area of metamaterials and offering unprecedented capabilities to create naturally unobtainable materials with intriguing electromagnetic, acoustic, and mechanical properties. Acoustic metamaterials, a subset of mechanical metamaterials, manipulate the propagation of acoustic waves, allowing sound-attenuation over a specific bandwidth (i.e., forbidden band). Total shielding over a full band frequency as one of the ultimate goals, however, has not been achieved. Moreover, the capability of mechanical metamaterials to shield dynamic loads (e.g., mechanical vibrations) in full band frequency, has also not yet been achieved. It would significantly advance the fundamentals of dynamics of mechanical metamaterials if a general theoretical platform can be developed to create metamaterials as a perfect energy shield to totally shield the propagation of the vibration energy over full band frequencies.

SUMMARY

The present disclosure relates to innovative mechanical metamaterials as a perfect energy shield for full band vibration isolation using an undiscovered principle: if the input vibration energy from the source can only be circulated between the mechanical metamaterial (i.e., the isolator) and the source, the to-be-isolated object (i.e., payload) is isolated from the input energy—dynamic energy cloaking. The mechanical metamaterials disclosed herein can be envisioned as Ouroboros type structures where all energies are transferred outside the payload (FIG. 1) and thus the dynamic energy does not "feel" the payload because the mechanical metamaterial has absolute zero stiffness.

More particularly, the present disclosure relates, for example, to a new mechanical metamaterial based on an absolute zero stiffness characteristic of an artificial element that can isolate vibrations in full band frequency. Furthermore, the isolation performance of the metamaterial may be adjusted in-situ according to a change of loading. This model is an improvement over and can prevent failures seen in quasi-zero stiffness (QZS) isolators within a low frequency range or with large amplitude. Moreover, this model provides a mechanical metamaterial for applications in the field of mechanical engineering, aerospace, civil engineering, medical instruments and the like. The new metamaterial may be used in, for example, medical instruments with low-frequency vibration, infant car seats, bike saddles, and the like. It also can be applied in vibration isolation for precision instruments in the area of aerospace and space exploration.

Manipulation of the interactions between matter and wave is the central theme for metamaterials. The capability of an energy shield in full band frequency has not yet been achieved. The present disclosure relates, for example, to forming a perfect energy shield by solely circulating energy between a metamaterial and an energy source, thereby creating vibration isolation. Unprecedented shielding effects were experimentally demonstrated under low and ultra-low vibrational frequency ranges. Along with the widely explored mechanisms, namely "energy bypass" and "energy absorption", the "energy shield" mechanism opens a new direction to design metamaterials with unprecedented dynamic characteristics in various physical systems in different length scales, as shown in FIG. 16.

Upon energy flux being applied to a composite that includes an encased object (i.e., payload) and surrounding metamaterials, one of or both of the work conjugate variables (e.g., force and displacement for the mechanical energy) must be inevitability applied to the composite. The goal of a perfect energy shield is to totally isolate the payload from the input energy. In other words, the state of the payload (e.g., equilibrium for a mechanical system) should not be altered by the input energy flux, and thus the payload does not "feel" the input energy flux. As described herein, a mechanical metamaterial can circulate the energy between the metamaterial and the energy source, and thus exert constant force to the payload. Input energy-independent constant forces to an object such as the payload is independent from the input energy flux, which can find numerous applications as, for example, a vibration isolator. A theoretical analysis and experimental testing demonstrate the feasibility of isolating the input energy from the payload and maintaining an unaltered equilibrium state. This mechanical metamaterial can function as an absolute-zero-stiffness component to isolate vibrations in low and ultra-low frequency ranges (e.g., lower than 20 Hz) that are harmful to a person's health because of resonance with human organs. The basic principle of designing a perfect energy shield, i.e., solely circulating the input energy between the energy source and the metamaterials, represents a new mechanism to manipulate the propagation of waves, and can find applications in various physics, such as the control of acoustic waves in mm-cm scales and thermal insulation in atomistic scales.

In accordance with one embodiment, a metamaterial system for protecting a payload from external energy flux generated by an energy source includes a mechanical, metamaterial framework configured to circulate the external energy flux between the metamaterial system and the energy source.

Other aspects of the disclosure will become apparent by consideration of the detailed description and accompanying drawings.

BRIEF DESCRIPTION OF THE DRAWINGS

FIG. 4B illustrates an arbitrary configuration during movement of an object, in accordance with some embodiments.

FIG. 4C illustrates performance of a vibration isolator at 1 Hz, in accordance with some embodiments.

FIG. 5 illustrates finite element results on the normalized force applied on the payload and effective stiffness of the mechanical metamaterial as the metamaterial is subjected to quasi-static vertical displacement v.

DETAILED DESCRIPTION

Figure 1:
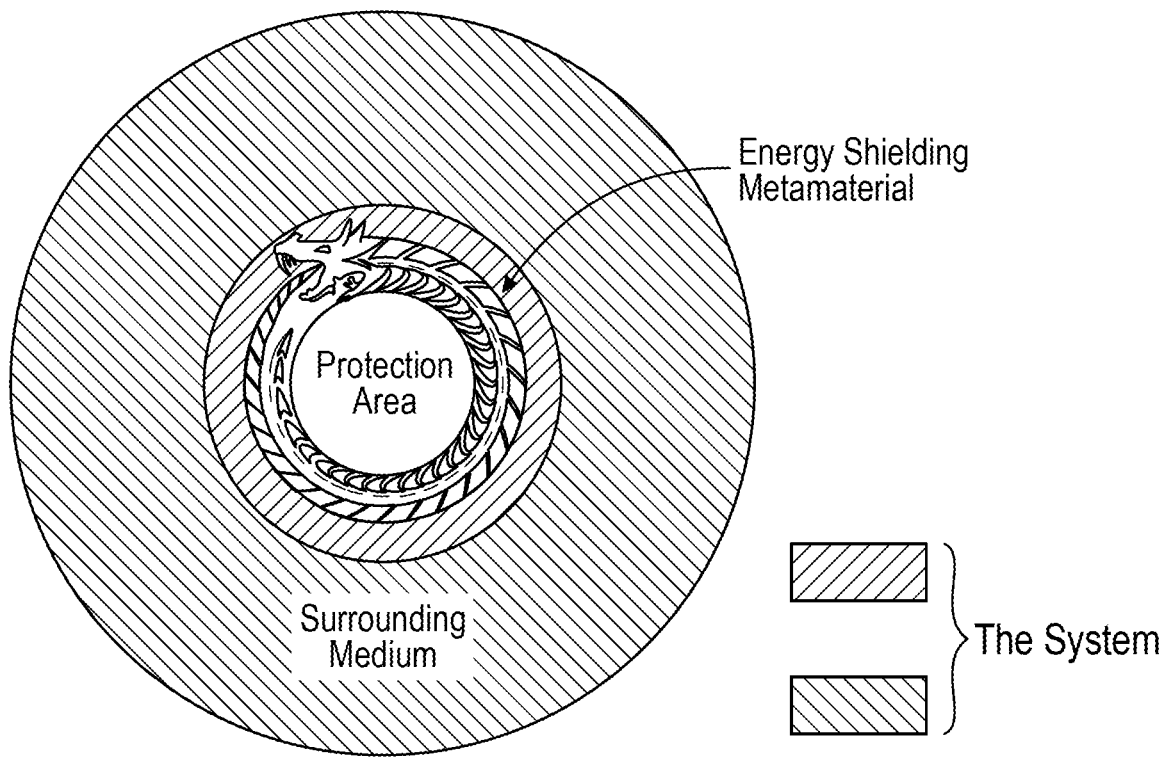
FIG. 1 schematically illustrates an envisioned energy shielding mechanical metamaterial.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Recent advances in micro- and nano-fabrication, topological optimization, machine learning, and 3D printing are transforming science fiction gadgets into real artificial materials, i.e., metamaterials. Examples include invisible cloaks in literary fiction enabled by electromagnetic and optical metamaterials that control the interactions between waves and matter, a perfect lens, an absorber, and cloaking. Exotic properties, such as auxetics, negative thermal expansion, multi-stability, and elasto-mechanical cloaking have been exhibited by mechanical metamaterials. Acoustic metamaterials, which are a type of mechanical metamaterial, focus on dynamic properties in the frequencies perceptible by humans and are usually not suitable for practical applications because of their complex design and manufacturing difficulty. Acoustic metamaterials also focus on controlling of acoustic waves over a specific bandwidth and were initially created for use in sound-attenuating applications. Today, achieving a complete attenuation of acoustic energy over a full band frequency, i.e., perfect acoustic energy shielding to block environmental noise, is still one of the ultimate goals of acoustic metamaterials.

Overall, the existing studies for mechanical metamaterials are mainly for static properties with only the acoustic metamaterial investigating the dynamic properties. Even for the dynamic properties of acoustic metamaterials, however, the focus is not on the full-band properties, just particular frequency ranges with interesting mechanical properties. At these particular frequency ranges, i.e., bandgap, the propagation of acoustic wave can be suppressed but not be perfectly isolated. It would significantly advance the fundamentals and open more space for applications, if the propagation of the wave can be ideally forbidden over the full-band frequencies using deliberately designed mechanical metamaterials since the mechanical vibrations propagate in wave and always cover the full-band frequencies. An enemy shield can be found in many science fiction stories, for example, a deflector shield appears in the Star Wars movies, which encases and protects an object from input energy flux. However, energy shields have not yet been created using mechanical metamaterials.

Mechanical vibrations are ubiquitous which can cover full band frequency in theory. Many encountered mechanical vibrations in our daily lives are in the low frequency domain. For example, the frequency for human walking is about 2 Hz, 0.5-25 Hz for vehicles traveling on normal roads, and 0.0001-0.1 Hz for ocean tide. Mechanical vibrations in low and ultra-low frequency ranges are undesirable in many areas, particularly in engineering systems and medical spaces, such as in operation, transportation of precision instruments, and patient transfer. Specifically, for humans, the natural frequency of many of our organs is in this frequency range; and thus, low frequency excitation may cause resonance and damage the organs. For example, vibration of vehicle seats may cause serious health damage to newborns.

According to linear vibration theory, the lower the natural frequency of a system, the lower the frequency of the start of an isolation effect by the system. However, traditional linear passive vibration isolation systems are characterized by a trade-off between the starting isolation frequency of the system and the static bearing capacity of the system.

Vibration isolation has been a decades-old problem with the goal to isolate the payload (i.e., the object to be isolated) from the vibration source. There are two metrics to evaluate the performance of a vibration isolator: (1) effective bandwidth, and (2) low-frequency characteristics. Though high frequency vibration can be readily isolated by damping fins, low frequency vibration that is of great importance to our daily lives, is quite difficult to isolate, which can be understood through a simple linear system, represented by mass in (i.e., payload), spring k, and damper c. The appreciable isolation occurs when the excitation frequency exceeds $\sqrt{2}f_0$, where $$f_0 = \frac{1}{2\pi}\sqrt{\frac{k}{m}}$$

is its natural frequency. Consequently, to achieve a superior ultra-low frequency performance, it requires vanishing stiffness, i.e., k→0. Vanishing stiffness, however, suggests no static load bearing capability. This "catch-22" leads to active and nonlinear passive vibration isolations.

An active vibration isolator includes a set of sensors (e.g., accelerometers or gyroscopes), a processor and a bunch of actuators. The sensors and the associated circuit collect and process the vibration signal and then provide feedback to actuators to generate a reaction to counterbalance the vibration of the object. Though promising, because of the involvement of many moving parts and the capability of the actuators, active vibration isolators are mainly utilized in relatively small displacement for precision devices.

Figure 2:
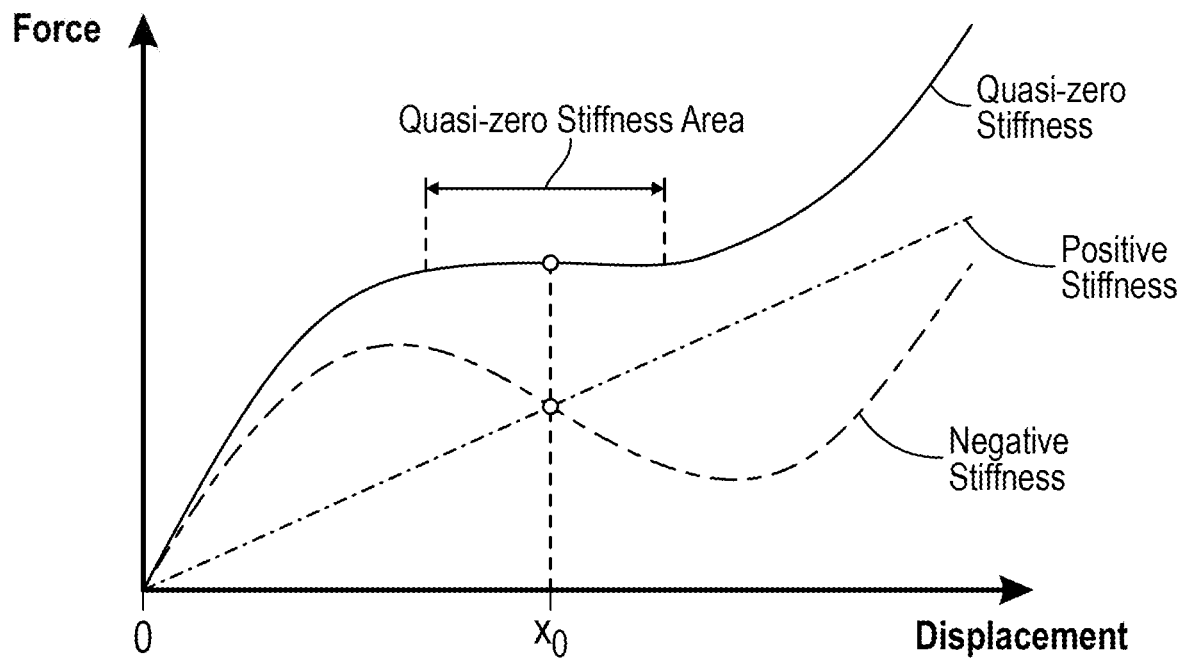
FIG. 2 graphically illustrates the principle of quasi-zero-stiffness (QZS) structures.
Figure 3:
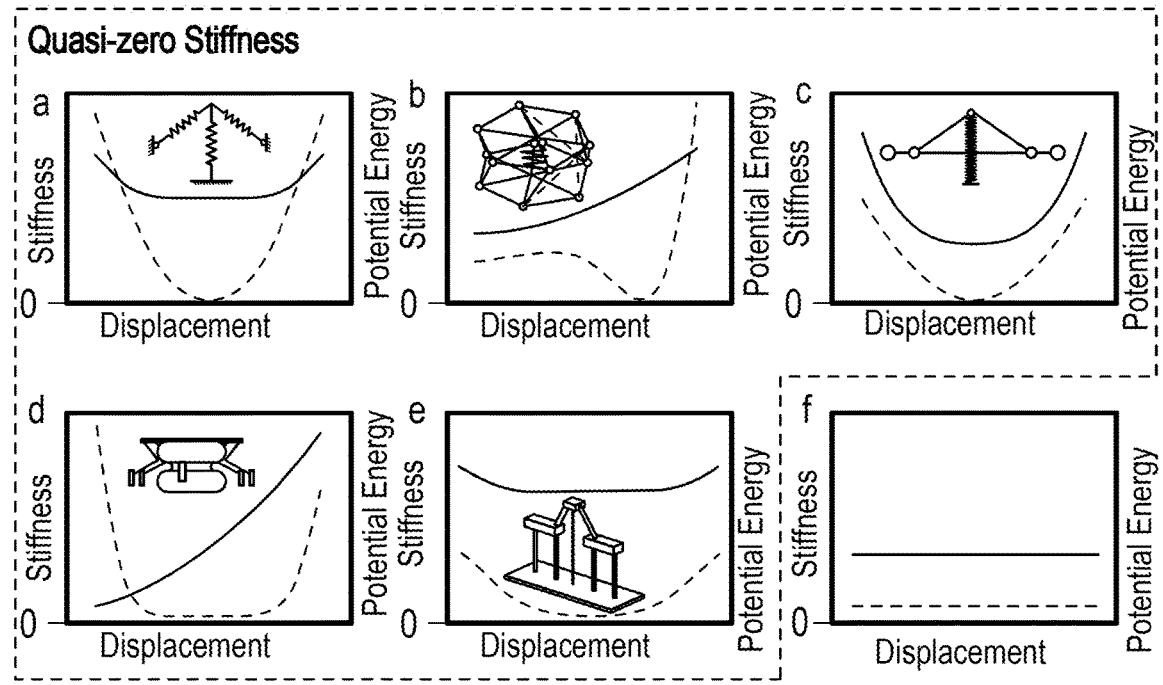
FIG. 3 illustrates examples of quasi-zero-stiffness (QZS) structures and an absolute zero stiffness system.

Amid widely adopted so-called high-static and low-dynamic stiffness passive vibration isolators, quasi-zero-stiffness (QZS) systems have been widely studied. QZS systems appropriately combine the positive and negative stiffness components to construct a nonlinear system with an effective stiffness close to zero around the static equilibrium position. The high static stiffness is provided by the positive stiffness components, while the low-dynamic stiffness is achieved by the synergetic interactions between positive and negative stiffness components as illustrated in FIG. 2. Some examples of QZS systems are shown in FIG. 3, where two inclined springs function as negative stiffness components (a), deformable origami structures have been explored (b), permanent magnet and spring combination provides a possibility (c), and previously designed structures including sliding tracks have been used to broaden the frequency range (d and e). QZS systems have achieved appreciable effectiveness of vibration isolation, such as low as −5 dB transmissibility (defined as $20\log|a_{output}/a_{input}|$, where $a_{output}$ is the response acceleration at the payload and $a_{input}$ is the input acceleration by the vibration source) at 10 Hz. However, the performance of the vibration isolators based on the concept of QZS has not yet satisfied the need of vibration isolation in the low frequency ranges, especially for the applications in precision instruments and healthcare. More importantly, the fundamentals of QZS have not been significantly advanced for decades.

With continued reference to FIG. 3, any QZS isolation system only presents quasi-zero stiffness in a finite range around the static equilibrium position. Thus, it is invalid to isolate vibrations with ultra-low frequency (due to the quasi-zero stiffness property) and with large amplitude (due to the finite range around the equilibrium position).

From an energy perspective, the operating principle of QZS isolation systems can also be illustrated. The input energy in any QZS systems from vibration source are split into three parts: a small fraction of energy is continuously applied to the payload (causing some vibration of the payload), some energy reserves in the QZS system itself (through kinetic and/or potential energy in the QZS system), while the remaining energy returns to the vibration source.

The inventors have discovered a novel way to design a perfect energy shield (e.g., vibration isolator). Specifically, the inventors have discovered that if the energy applied to the payload can be completely eliminated, a perfect energy shield can be designed. The energy shield may act as an energy converter that solely circulates the energy between the energy source (e.g., vibration source) and the energy shield (e.g., vibration isolator). Thus, the energy shield prevents energy flowing into the payload, leading to a perfect energy shield. This perfect energy shield would work for any frequencies. Consequently, the payload does not "feel" the presence of vibration source for full-band frequencies—ideal vibration isolation; and vice versa, the vibration source does not "feel" the existence of the payload—mechanics cloaking. The perfect energy shield also means absolute zero stiffness, as shown in (f) of FIG. 3.

Figure 4A:
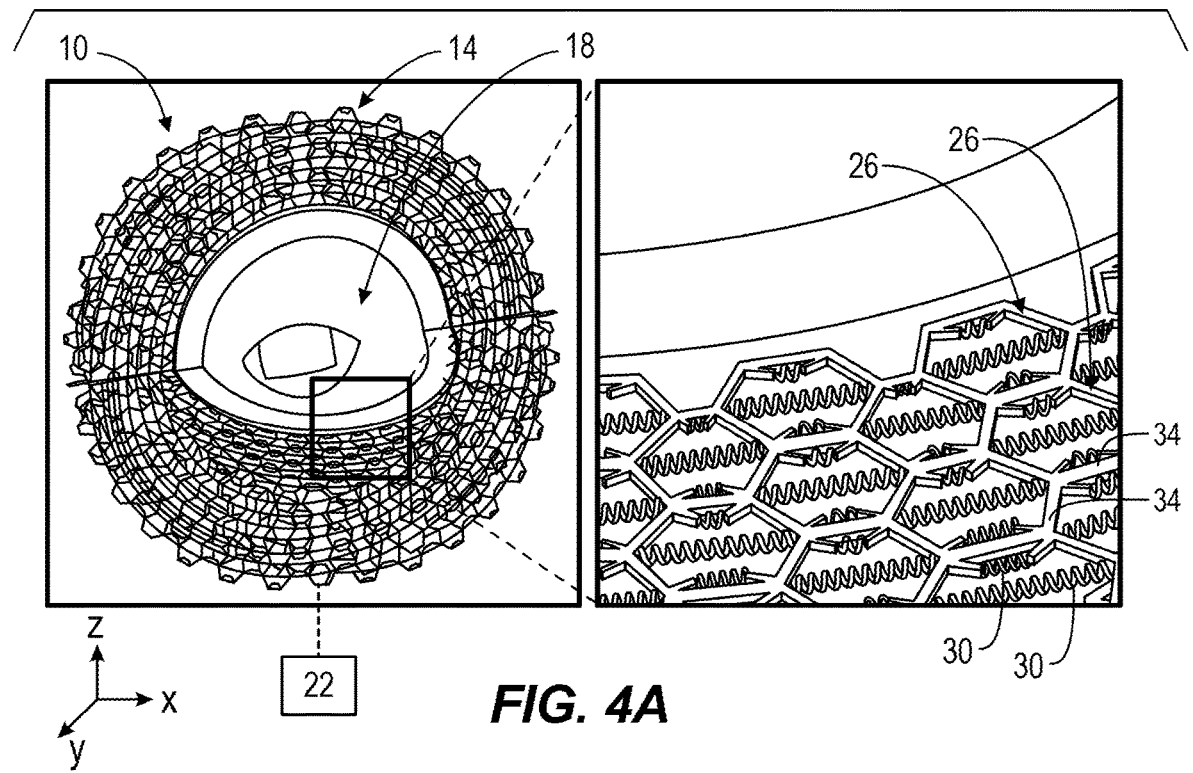
FIG. 4A illustrates a composite metamaterial framework with elements that form a shell to shield input energy flux from an object in the core of the composite structure, in accordance with some embodiments.

FIG. 4A illustrates a metamaterial system 10 according to one embodiment for use as a perfect energy shield. In the illustrated embodiment the metamaterial system 10 is a composite structure with mechanical metamaterials that form a metamaterial framework 14 (e.g., mechanical shell) to shield a payload 18 in the core of the metamaterial framework 14 from input energy flux generated by an energy source 22 (illustrated schematically in FIG. 4A). Before input energy flux is applied to the metamaterial framework 14, the payload 18 is subjected to forces and/or moments (e.g., gravitational force or the forces exerted from the surrounding metamaterials) and may exist in an equilibrium state. Upon application of the input energy flux, the mechanical, metamaterial framework 14 further deforms and only allows the energy to circulate between the metamaterial framework 14 and the energy source 22. The exerted forces to the payload 18 remain unchanged. The metamaterial framework 14 includes at least one unit cell 26. Each unit cell 26 may include one or more elastic elements 30 (e.g., springs, rubber bands, elastic rods, etc.) and may include one or more inelastic elements 34 (e.g., inextensible bars).

FIG. 4B illustrates one embodiment of a unit cell 26 that is artificial and deformable. The unit cell 26 includes six sides including four sides of inextensible bars (inelastic elements 34) of length a that comprise two pairs of pivotably connected length a sides of inextensible bars. The bars are connected at pivot points 38. Other embodiments include unit cells 26 with different numbers of sides (e.g., four sides, eight sides, etc.), as well as different numbers of pairs of inextensible bars. In the illustrated embodiment, two of the six sides (the top and bottom sides in FIG. 4B) are end sides of inextensible bars (further inelastic elements 34), wherein each end side inextensible bar is pivotably connected (via further pivot points 38) to both of the pairs of the pivotably connected length a sides of inextensible bars. As illustrated in FIG. 4B, an external angle between a length a side inextensible bar and a line parallel to an end side inextensible bar is θ (theta) degrees. The unit cell 26 also includes four spring connection inextensible bars (further inelastic elements 34) of length h that are internal to the unit cell 26 and each of the four spring connection inextensible bars are connected at each intersection of an end side inextensible bar and a side of length a inextensible bar. Two of the springs (e.g., shorter elastic elements 30 seen in FIG. 4B), each with spring constant $k_2$, are disposed parallel to the end sides, where each of the $k_2$ springs are uniquely connected between two spring connection inextensible bars of length b. One spring (e.g., longer elastic element 30 seen in FIG. 4B) of spring constant $k_1$ is connected between the two pairs of pivotably connected length a sides of inextensible bars at the intersection of the inextensible bars of each of the two pairs. Other embodiments of a unit cell 26 include different numbers and arrangements of sides, inelastic elements 34 (e.g., bars), pivot points 38, and elastic elements 30 (e.g., springs) than that illustrated. For example, some embodiments include fewer or more than six sides (e.g., 8 sides, 10 sides, etc.), or include fewer or more than three elastic elements 30 (e.g., 2 springs, four springs).

Analysis of a unit cell 26 carrying a dead load payload 18 (e.g., a mass block with weight Mg), as shown in FIG. 4B, explains why the composite unit cell 26 isolates input energy from the payload 18 (i.e., the mass block). Before the input energy is applied to the metamaterial system 10, the payload 18 is in an equilibrium state. In other words, the force exerted from the unit cell 26 to the payload 18 balances with the weight Mg. To isolate the input energy or vibration from the environment F(t), the states of the payload 18, (e.g., equilibrium and position), must not change and thus the force exerted from the unit cell 26 to the payload 18 remains Mg. To obtain the necessary conditions for vibrating energy isolation over full band frequency, quasi-static (f≈0 Hz) analysis was employed to explore the relationships among the parameters, i.e., a and b geometrical parameters, $k_1$ and $k_2$ spring constants, in mass of the metamaterial, and θ the state of the unit cell 26 with θ=0 for a completely collapsed state and θ=90° for a completely deployed state. Under static equilibrium, $F(t)=F_0=(M+m)g$. In this example, to ensure the state of the payload 18 remains unchanged at any θ, the input energy $W_{input}=2a(M+m)(1-\sin\theta)g$ must totally convert to the potential energy of the composites including the spring energy and the gravitational potential energy of the metamaterial, i.e., $W_{potential}=Mga(1-\sin\theta)+4b^2 k_2(1-\sin\theta)^2+2a^2k_1\cos^2\theta$. Equate $W_{input}$ and $W_{potential}$ and obtain the following relations, $$\frac{k_1}{k_2} = 2\left(\frac{b}{a}\right)^2, \text{ and} \quad (1)$$

$$k_1 = \frac{(2M+m)g}{4a}. \quad (2)$$

These two requirements ensure that the payload 18 can reach equilibrium at any given location described by θ. Or in other words, the unit cell 26 has effective zero stiffness (see FIG. 5) and isolates the input energy from the payload 18. Static force analysis shown in FIGS. 6A-6D also verifies a constant force exerted from the unit cell 26 to the payload 18. Furthermore, it can be shown that under these two requirements, the unit cell 26 isolates the payload 18 from the environment under arbitrary dynamic loads.

Dynamic analysis was performed using Lagrangian mechanics, $$\frac{d}{dt}\left(\frac{\partial L}{\partial \dot{q}_j}\right) - \frac{\partial L}{\partial q_j} = Q_{q_j}.$$

Here, $\{q_1,q_2\}=\{y,\theta\}$ are the generalized displacements; $\{\dot{q}_1,\dot{q}_2\}=\{\dot{y},\dot{\theta}\}$ are associated generalized velocities; $\{Q_{q_1},Q_{q_2}\}=\{F(t),0\}$ are the generalized forces; L=T−U is the Lagrangian with T and U as the kinetic and potential energy of the composite, respectively.

As detailed below, it has been shown that a constant force Mg is exerted from the mechanical metamaterial framework 14 (e.g., one or more unit cells 26) to the payload 18 when a dynamic input force F(t) is applied onto the mechanical metamaterial framework 14, and consequently the payload 18 remains static under dynamic loading on the metamaterial the metamaterial framework 14 of one or more unit cells 26 perfectly shields the payload 18 from the environmental vibration and works over full band. FIG. 4C shows a finite element result where a sinusoidal input displacement with 1 Hz frequency is applied on the bottom of the mechanical metamaterial framework 14. It is apparent that there is vanishing displacement at the payload 18.

Figure 7:
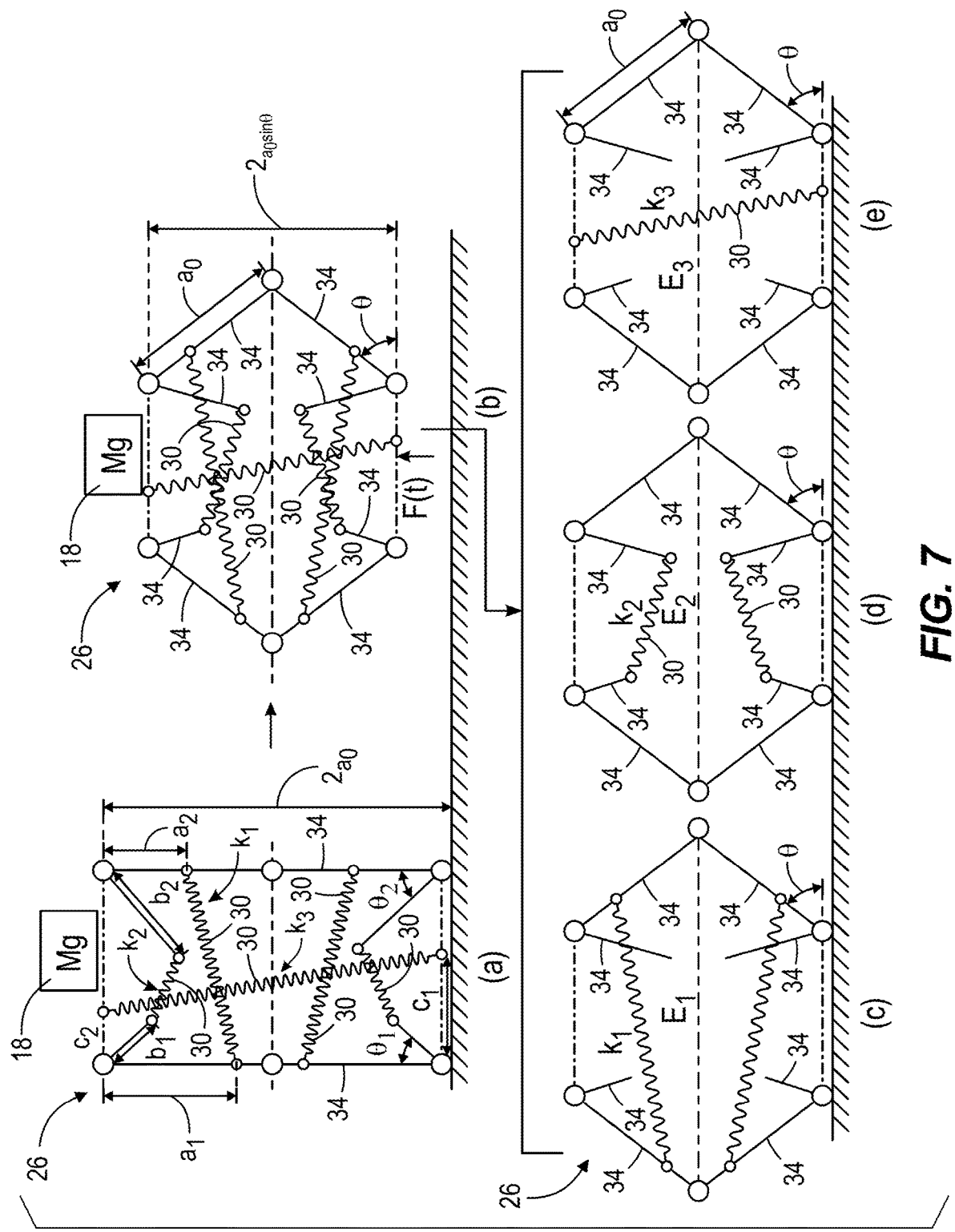
FIG. 7 illustrates arbitrary components as the starting points for the design using genetic algorithm.
Figure 8:
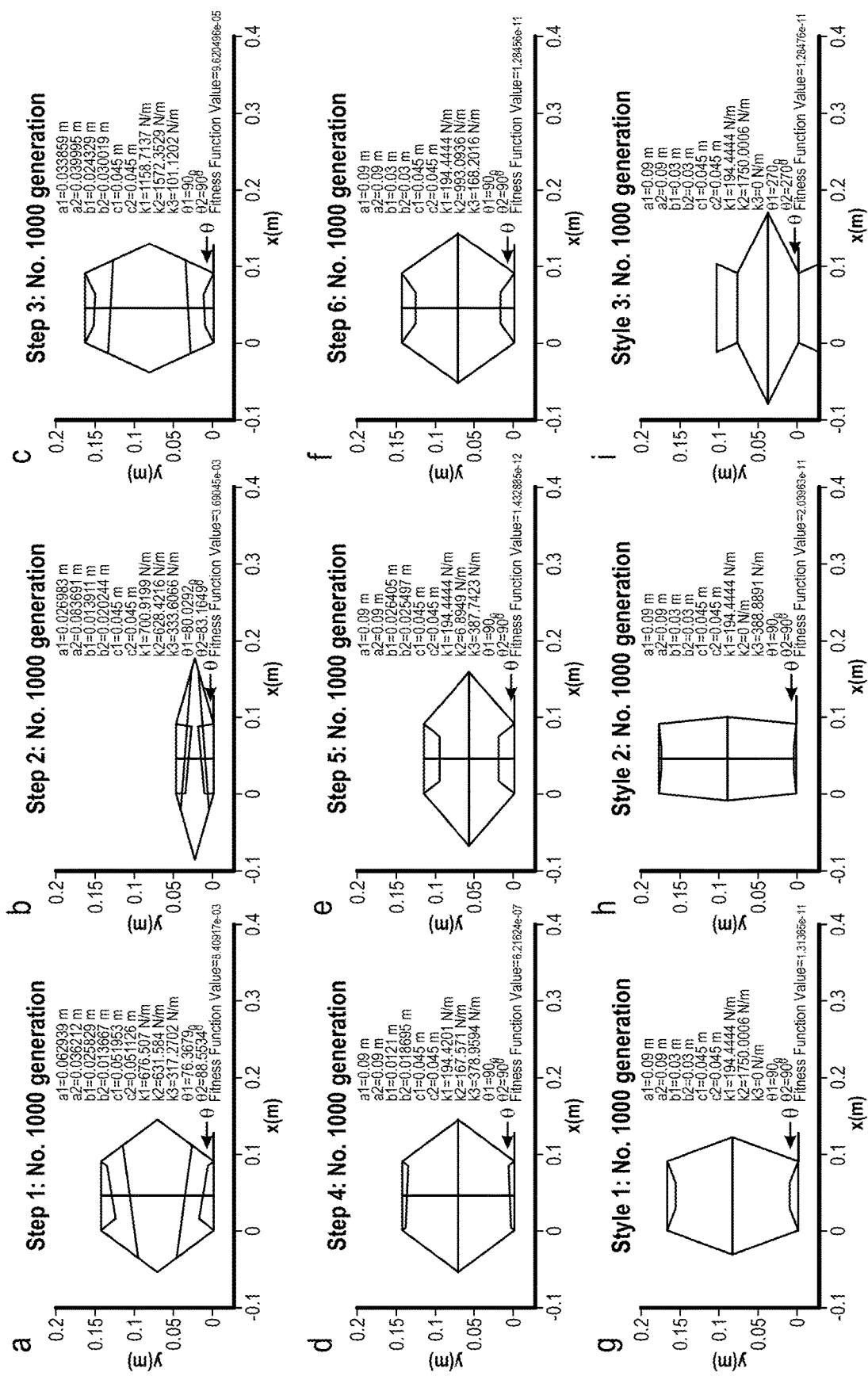
FIG. 8 illustrates a process of structural evolution using the genetic algorithm.

The input energy solely circulates between the metamaterial framework 14 and the energy source 22, and thus does not affect the payload 18. During testing, the genetic algorithm was utilized to perform the design under the constraint that the mechanical metamaterial unit cell 26 of the metamaterial framework 14 has six sides in a hexagon shape. A model with arbitrary design parameters was constructed using commonly used components (i.e., mass block, truss, and springs), as shown in FIG. 7. The genetic algorithm searched among the design variables by repeatedly modifying a population of individual solutions to find a combination(s) to achieve perfect energy shielding using the mechanism identified herein. FIG. 8 shows the process of structural evolution with 6 steps and each step evolved for 1,000 generations. In each step, a partially optimal generation with a narrow range of some parameters was reached. For example, from step 1 after 1,000 generations, the location of the vertical spring was fixed in the structure and started subsequent evolution steps. As shown in FIG. 8, the genetic algorithm found many structures (actually infinity if the simulation continued to run) that can function as perfect energy shielding. They can be divided into three categories ((g), (h), and (i) of FIG. 8). The first design that corresponds to the model given in FIG. 4B was chosen given practical engineering constraints, such as no compression springs, less components, and fabrication simplicity. A similar approach can be employed to create other metamaterial frameworks (not just mechanical metamaterials) based on the concept of solely circulating the energy between the metamaterial and the energy source 22.

Figure 9A:
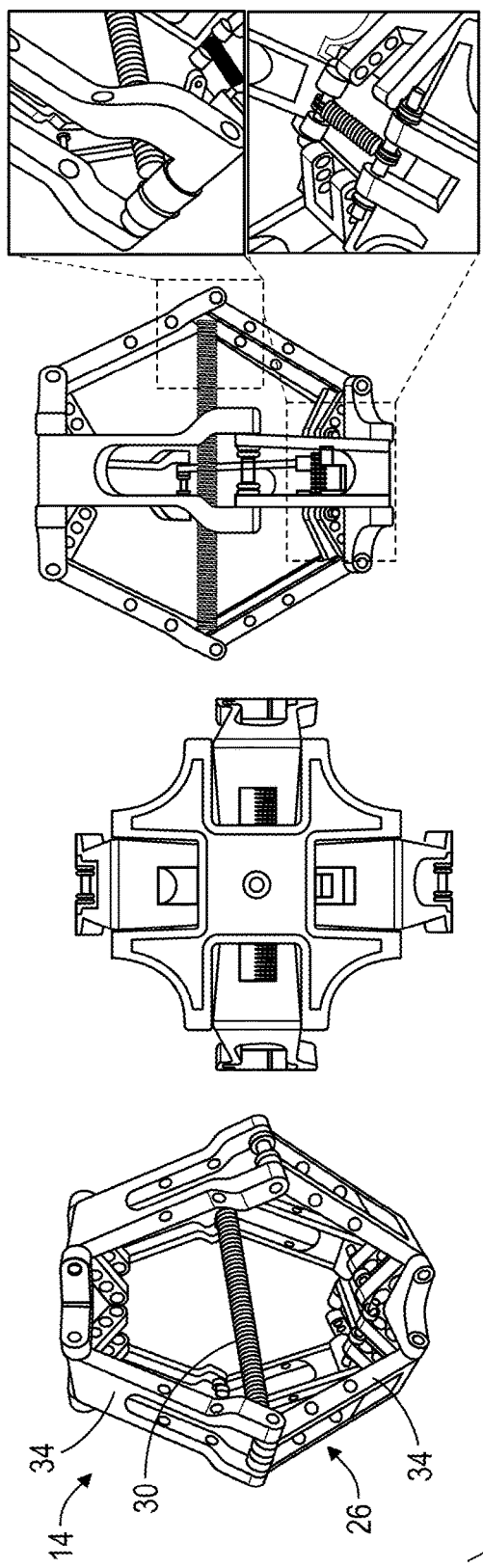
FIG. 9A is a photograph of a fabricated metamaterial framework, in accordance with some embodiments.

With reference to FIG. 9A, in some embodiments the metamaterial system 10 may be fabricated by 3D printing. In the illustrated embodiment, the mass in of the metamaterial framework 14 was neglected since it was much smaller than the mass M of the payload 18. FIG. 9A shows the metamaterial framework 14, where only one of the shorter springs ($k_2$) was mounted to reduce the balanced weight in half with $$\frac{k_1}{k_2} = \left(\frac{b}{a}\right)^2 \text{ and } Mg = 2ak_1.$$

Figure 9B:
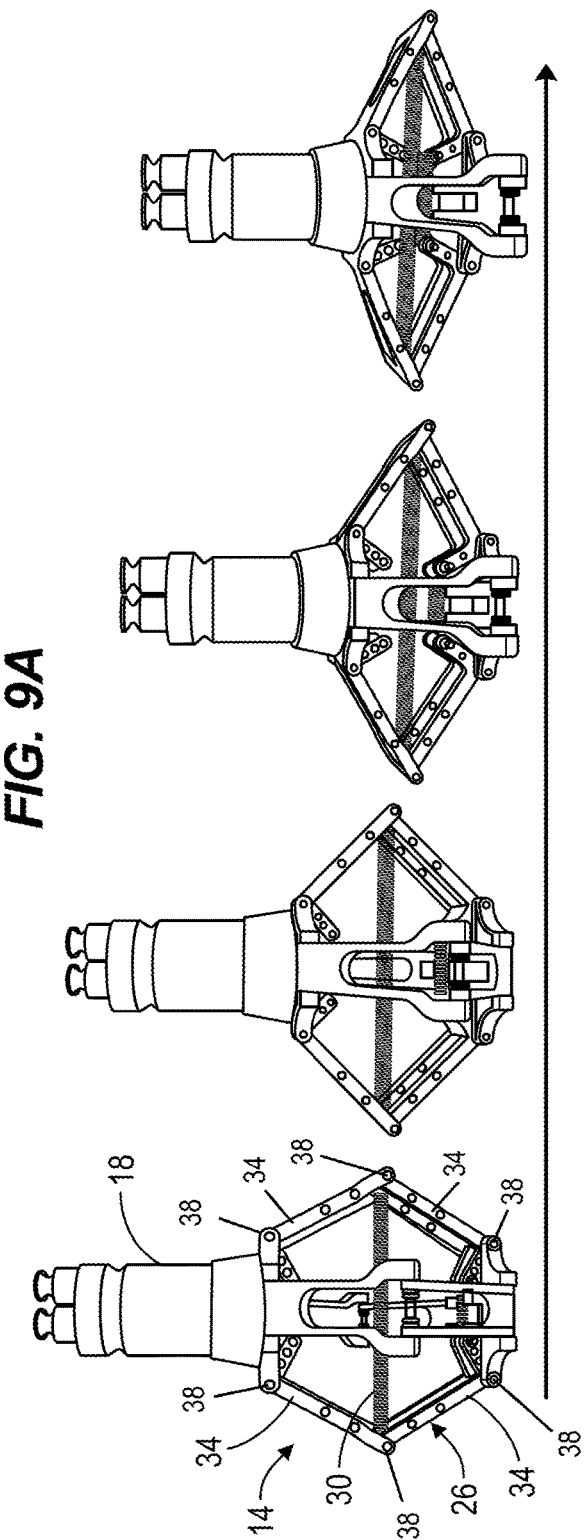
FIG. 9B illustrates equilibrium of a metamaterial framework at any position during the compression process, in accordance with some embodiments.

It is noted that a symmetric configuration was adopted to prevent unintentional leaning due to manufacture or vibration. The attribute of constant force (shown in FIG. 5) was verified by reaching balance at any position when the matching weight ($Mg=2ak_1$) was applied quasi-statically, as suggested by FIG. 9B.

Figure 10A:
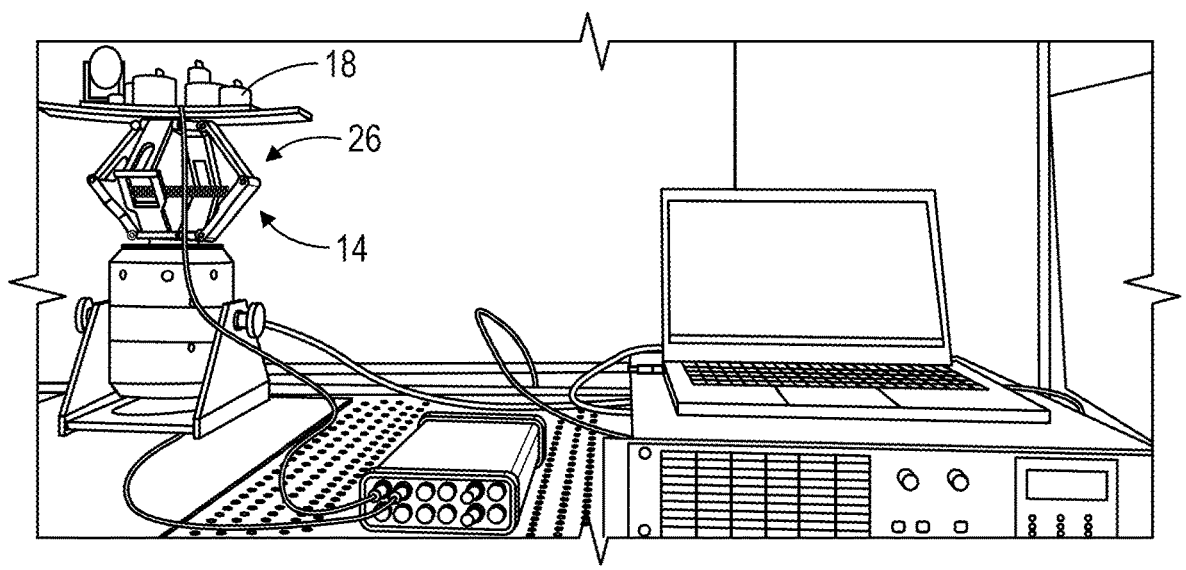
FIG. 10A is an image of an experiment instrument setup for measuring the vertical performance of a sample in the vertical direction, in accordance with some embodiments.
Figure 10B:
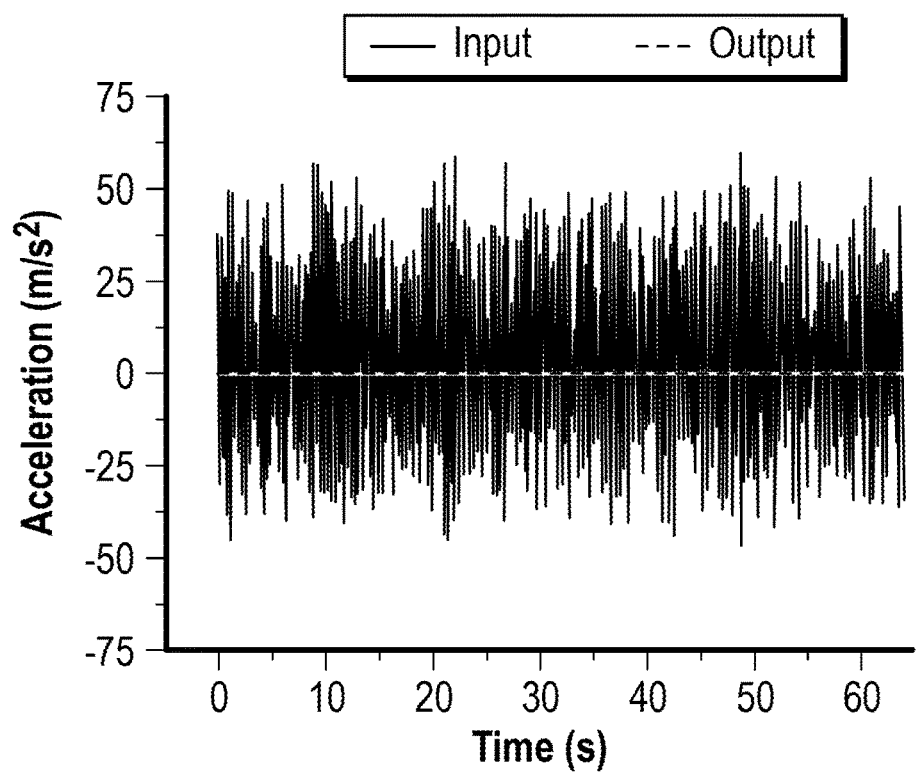
FIG. 10B shows a comparison of measured input and output acceleration for random vibrations during the experiment, in accordance with some embodiments.
Figure 10C:
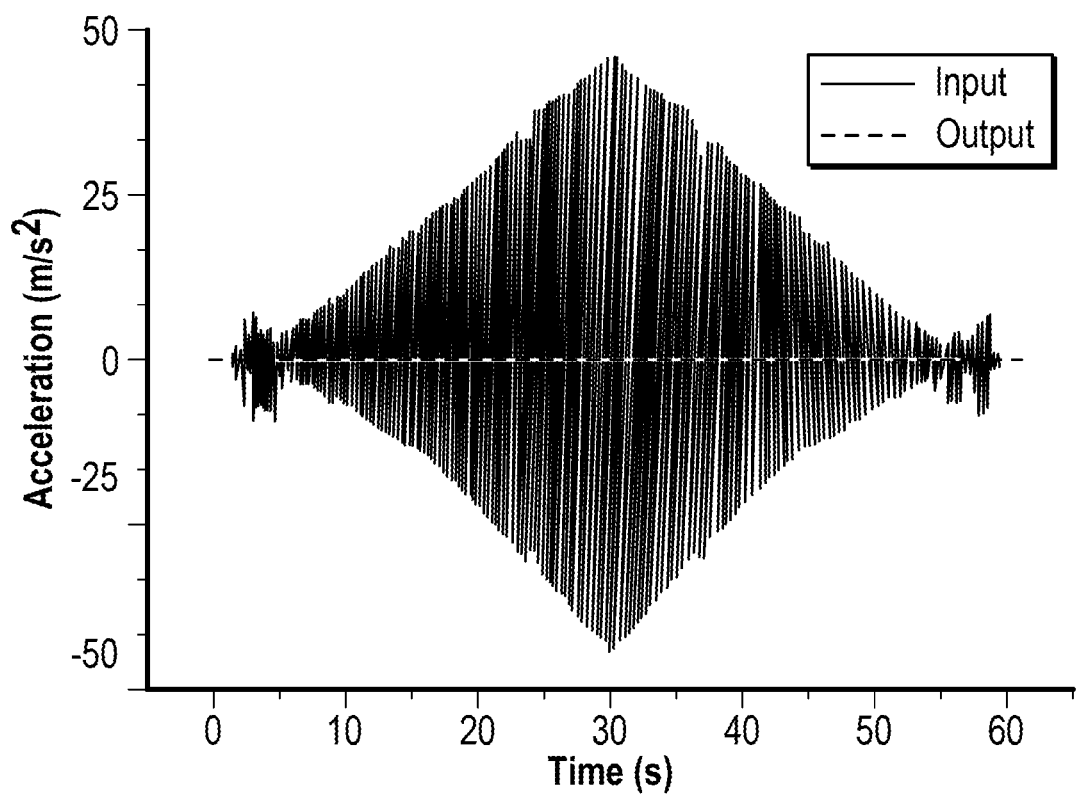
FIG. 10C shows a comparison of measured input and output acceleration for frequency sweep excitation during the experiment, in accordance with some embodiments.
Figure 10D:
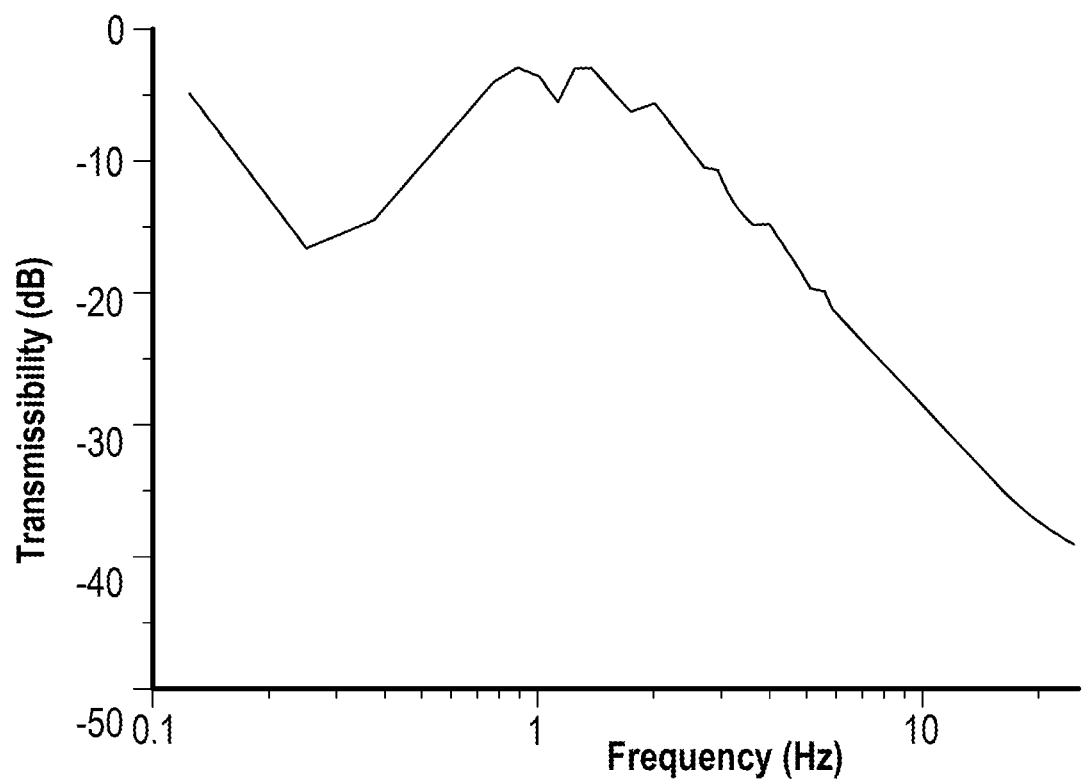
FIG. 10D illustrates a measured frequency response curve for a vertical experiment, in accordance with some embodiments.

FIG. 10A shows a setup that was used to test the performance of the metamaterial system 10 to shield the energy in the vertical direction. A random vibration with power spectrum spreading in the frequency interval [0, 25] Hz was generated by a shaker and applied to the bottom of the metamaterial framework 14. Two accelerometers mounted on the top and the bottom of the metamaterial framework 14 were used to measure the input and output accelerations. The comparisons of output and input accelerations for random vibration and frequency sweep are shown in FIGS. 10B and 10C, respectively, which clearly demonstrate that output acceleration measured at the payload was vanishingly small compared with the input acceleration, which verifies prominent vibration energy shielding effect. The transmissibility in dB defined by $$20\log\left|\frac{a_{output}}{a_{input}}\right|,$$

where $a_{output}$ is the acceleration at the payload and $a_{input}$ is the generated acceleration by the shaker. For low and ultra-low frequency ranges FIG. 10D shows that this mechanical metamaterial can significantly shield vibrations over almost the entire measured frequency band, from as low as 0.1 Hz to 25 Hz. This performance of this vibration isolator outperformed all reported quasi-zero-stiffness isolators and many active vibration isolators.

Figure 10E:
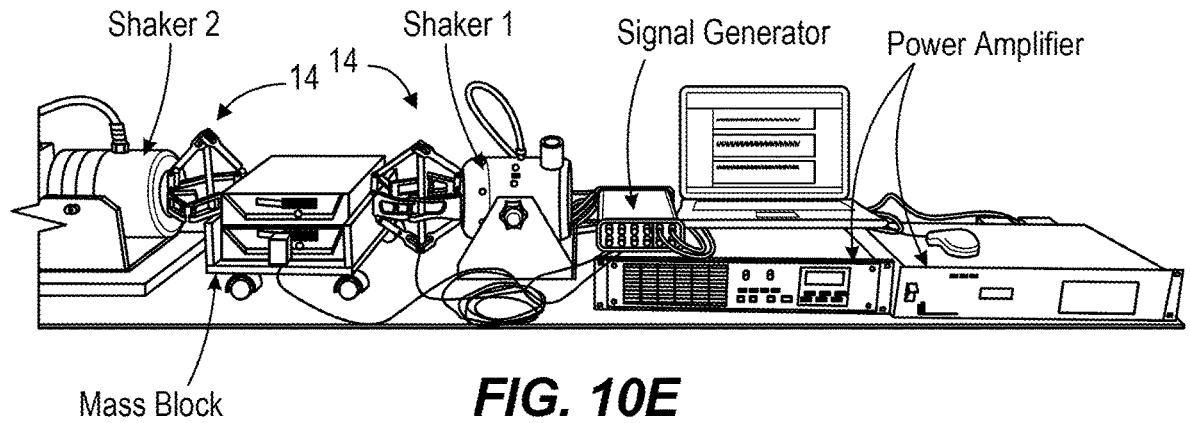
FIG. 10E illustrates an instrument setup for measuring horizontal performance of the metamaterial framework, in accordance with some embodiments.
Figure 10F:
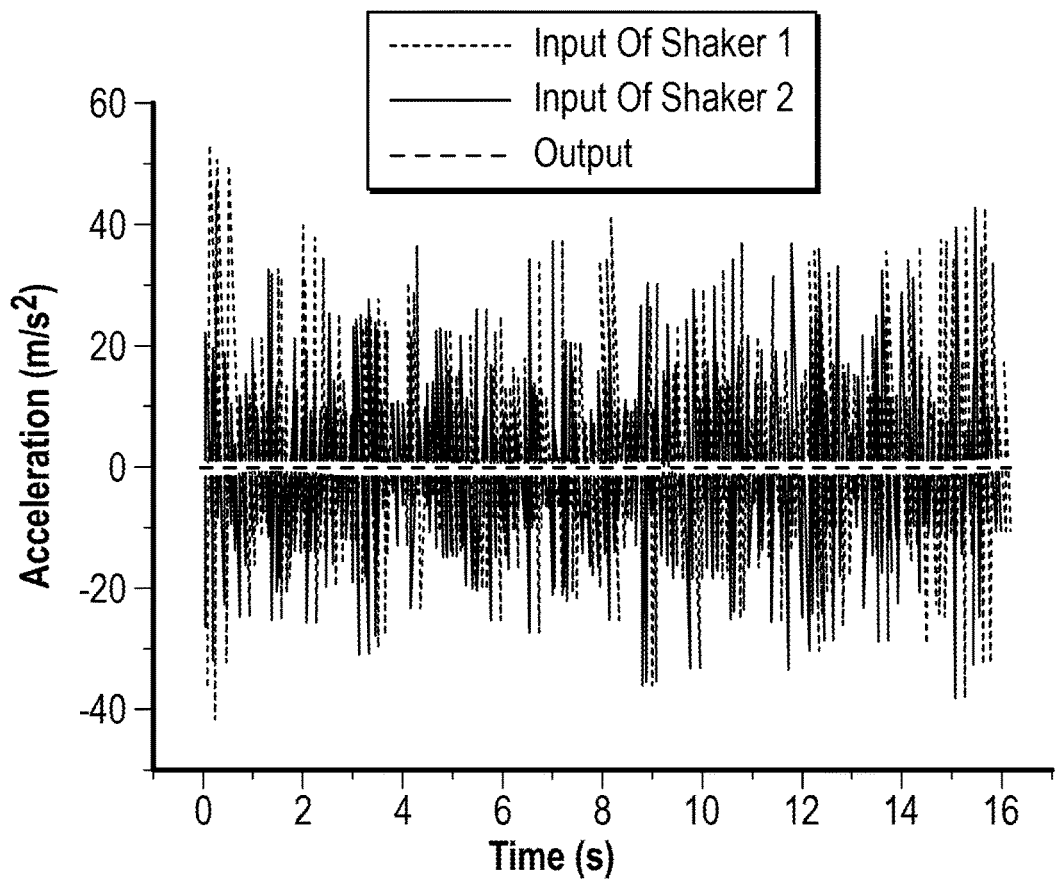
FIG. 10F illustrates a comparison of measured input and output acceleration when two shakers individually apply random forces on the metamaterial samples, in accordance with some embodiments.
Figure 10G:
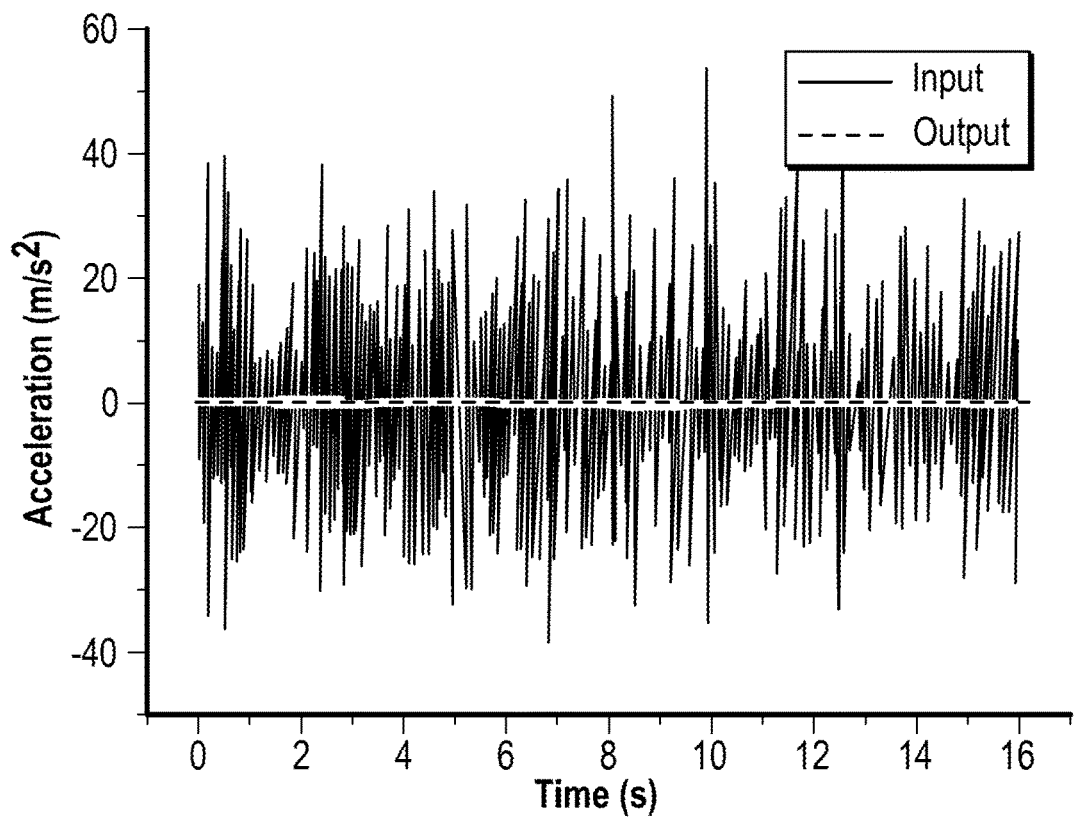
FIG. 10G illustrates a comparison of measured input and output acceleration when only one shaker applies random forces on a corresponding metamaterial sample, in accordance with some embodiments.
Figure 10H:
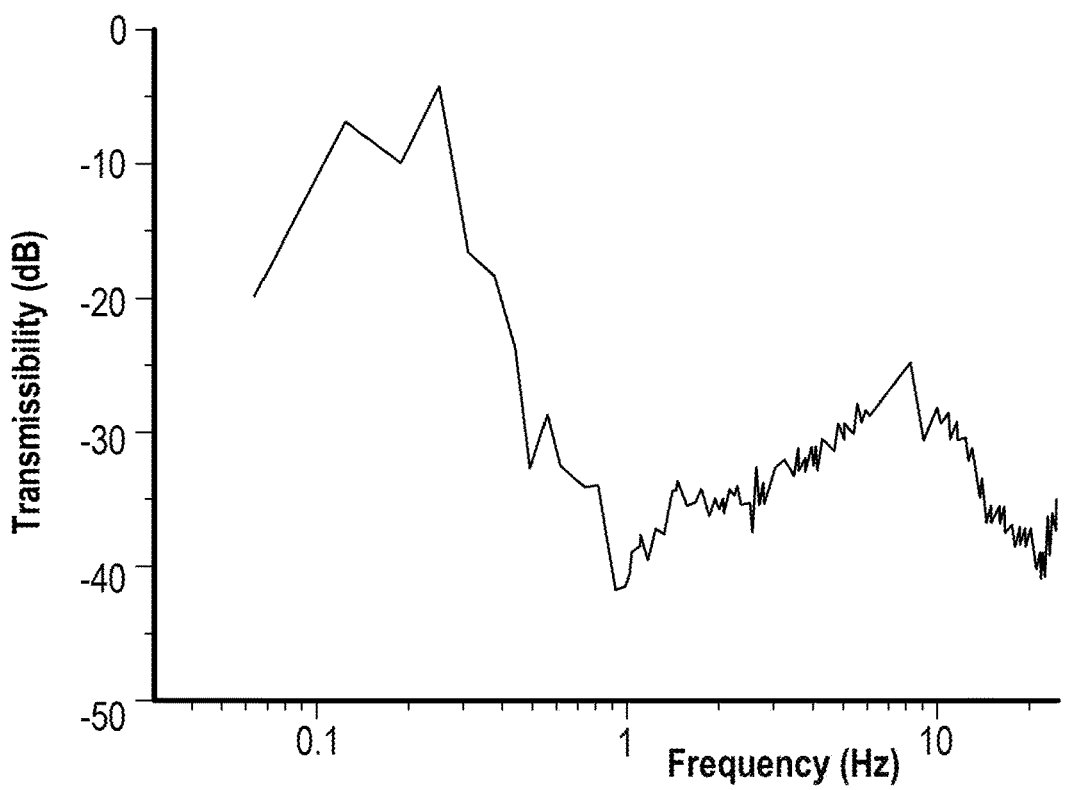
FIG. 10H illustrates a measured frequency response curve for metamaterial for a horizontal experiment, in accordance with some embodiments.

FIG. 10E shows an experimental setup that was used to test the performance of the metamaterial framework 14 to shield the energy in the horizontal directions. This composite comprises two identical (e.g., in size and shape) metamaterial frameworks 14 and a sandwiched payload 18. Two shakers individually imposed random forces on the metamaterial frameworks 14. The gravitational potential energy became irrelevant thus the static analysis given by FIGS. 6A-D can show that a constant force $2ak_1$ was exerted from the metamaterial framework 14 to the payload 18. The symmetry of the setup ensured that the sandwiched payload 18 was always subjected to a pair of constant force $2ak_1$ in the opposite directions, and thus the state of the payload 18 was independent to the applied forces. Lagrangian mechanics was employed to analyze the dynamic performance of this composite and found that the sandwiched payload was stationary and did not depend on the input force(s) (see below). FIG. 10F verifies that the output acceleration measured at the payload 18 was vanishing compared with the input accelerations of shakers 1 and 2. FIG. 10G shows that the system can still isolate vibrations when vibration is only from shaker 1 while shaker 2 keeps silent. The transmissibility for low and ultra-low frequency ranges of FIG. 10H again shows that this mechanical metamaterial system 10 and metamaterial framework 14 can significantly shield input random forces when only one shaker is active.

The metamaterial system 10 may be designed for tenability. As demonstrated previously by theoretical analysis, when the gravitational potential field enters the design, such as in FIG. 4B, one requirement is $$k_1 = \frac{(2M+m)g}{4a};$$

or equivalently, when the spring and geometry are chosen, the mass of the payload is determined and the constant force exerted by the mechanical metamaterial is fixed. To achieve tunable payload and constant but adjustable force using the same metamaterials characterized by spring constants and geometry, two new design parameters $\Delta a$ and $$\Delta b = \Delta a \cdot \frac{b}{a} = \Delta a \cdot \sqrt{\frac{k_1}{k_2}}$$

are introduced to allow the springs to have adjustable positions. As shown, for example, in FIGS. 14A-14E, the mass of the payload can be adjusted while keeping it shielded from the input energy.

Some mechanical metamaterial arrays have multiple unit cells 26. With the isolation performance of one unit cell 26 successfully verified, a mechanical metamaterial with multiple unit cells 26 was constructed. As shown in FIGS. 15A-15D, the merits of metamaterial arrays included better performance on energy isolation, higher tolerance on uncertainties, and higher load bearing capability.

As described herein, the metamaterial system 10 is an unexplored mechanism to design metamaterials as a perfect energy shield: circulating the energy between the metamaterial and the energy source 22, without passing to the payload 18. By applying this mechanism in the mechanical system, a vibration isolator was formed. Upon dynamic loads on the payload 18, the mechanical metamaterial system 10 exerted a constant force to the payload 18, with or without gravitational potential field; and thus, the state of the payload 18 was perfectly shielded from the input energy. Unprecedented shielding effects were experimentally demonstrated under low and ultra-low frequency ranges. The disclosed mechanical metamaterial systems 10 are different from many active systems, for example, amazing bird's head/neck that has been noticed and studied for decades. Amazing bird has the ability to maintain the stability of their heads through an active feedback system in amazing bird's body, and has inspired the development of active systems comprising sensors, actuators, and processors to counteract the input energy for shielding. The disclosed mechanical metamaterial systems 10 are passive and provide ideal shielding for input vibration energy and absolute zero stiffness. This metamaterial system 10 also significantly advances the development of passive systems, such as quasi-zero stiffness systems that combine the positive and negative stiffness components together to construct a non-linear system with a quasi-zero effective stiffness in a small range (FIG. 3). This is because the present mechanical metamaterial systems 10 are effective for full band while most of the quasi-zero stiffness systems can only shield input energy in a narrow amplitude range and cannot be applied to low and ultra-low frequency range.

Figure 11:
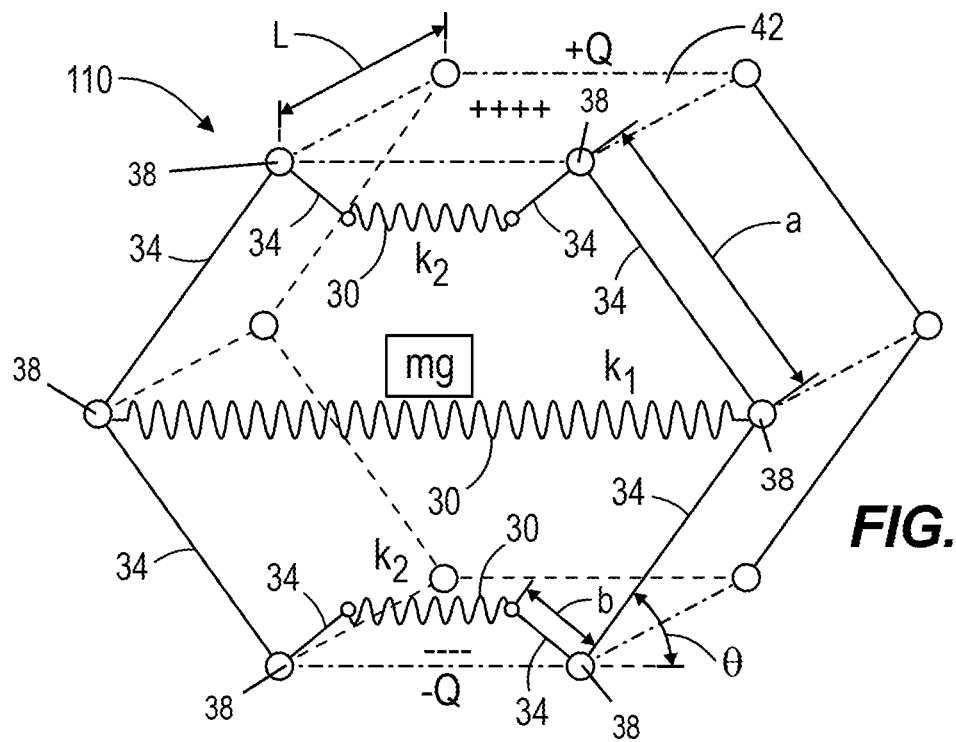
FIG. 11 illustrates a realization of energy shielding element in an electro-mechanical field.
Figure 16:
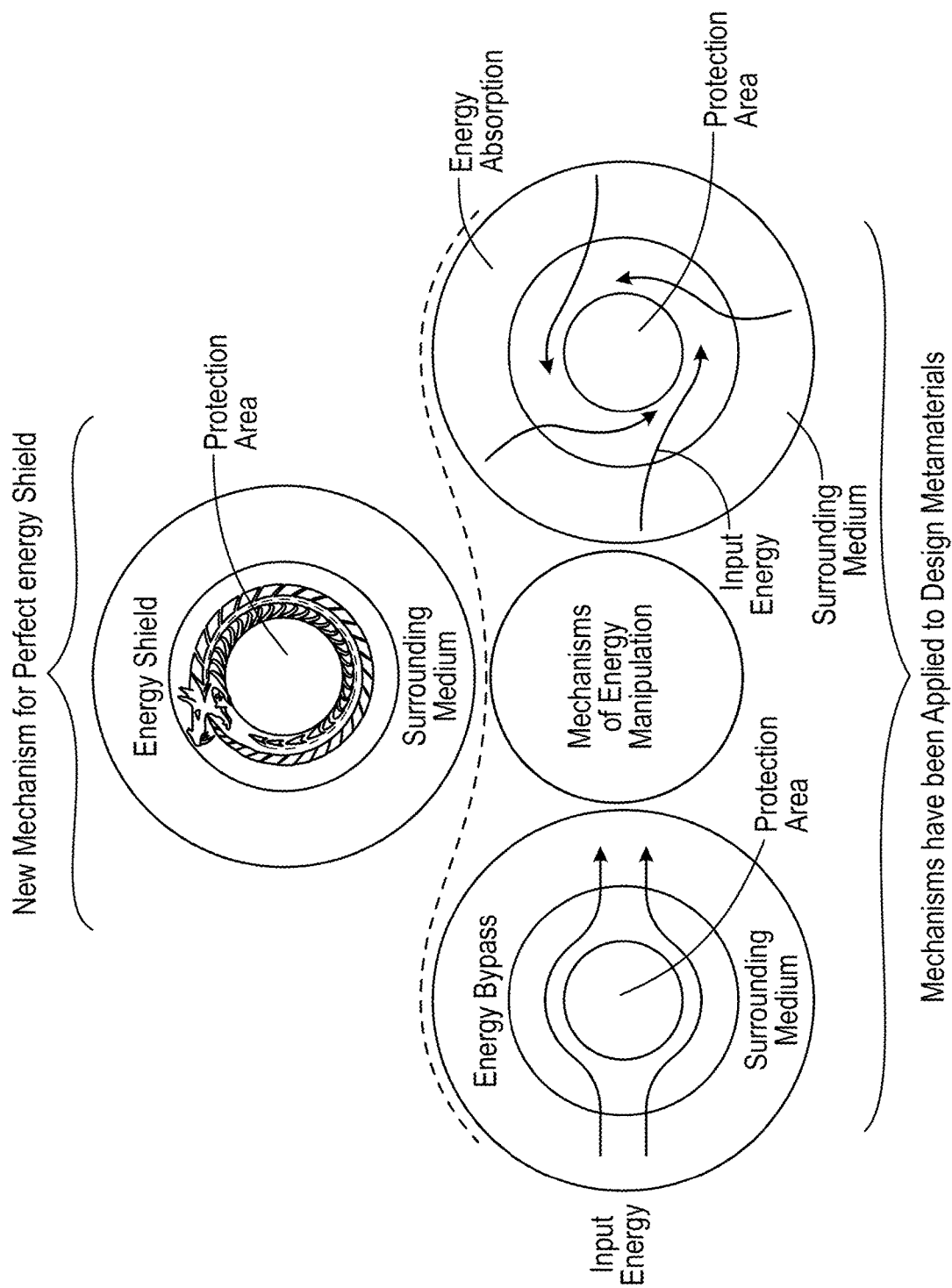
FIG. 16 illustrates three mechanisms for energy protection, including two previously studied mechanisms and a new mechanism proposed in the present disclosure based on absolute zero-stiffness element.

Though the principle was demonstrated through a mechanical metamaterial for vibration isolation, it can be applied to other physical fields as well. For example, as shown in FIG. 11, a similar electro-mechanical metamaterial system 110 was built by replacing the payload 18 in FIG. 4B with a capacitor 42 that stores electrical energy. This electro-mechanical metamaterial system 110 might be used to isolate the vertical mechanical energy in zero-gravity environment. In fact, the principle suggests a third mechanism for energy protection. As shown in FIG. 16, the first two "energy bypass" and "energy absorption" have been successfully explored to guide the dynamic waves with applications such as electromagnetic wave cloak (electric field) and sound wave stealth (acoustic field). The "energy shield" mechanism, presenting an Ouroboros type feature, can be used to other physical systems in various length scales. For example, perfect thermal isolation may become feasible using the same principle since zero stiffness materials can insulate thermal conduction in solid. Overall, the principle disclosed herein opens a new direction to design metamaterials with unprecedented dynamic characteristics to manipulate the interactions between matter and waves.

Static analysis was performed for the mechanical metamaterial systems 10. FIG. 5 illustrates finite element results on normalized force applied on the payload 18 and effective stiffness of the unit cell 26 of the mechanical metamaterial framework 14 as the metamaterial framework 14 was subjected to quasi-static vertical displacement v. The mass of the unit cell 26 of the mechanical metamaterial framework 14 was ignored. Constant force and zero-stiffness are shown. Solid Works® was used to perform the finite element analysis.

Figure 6A:
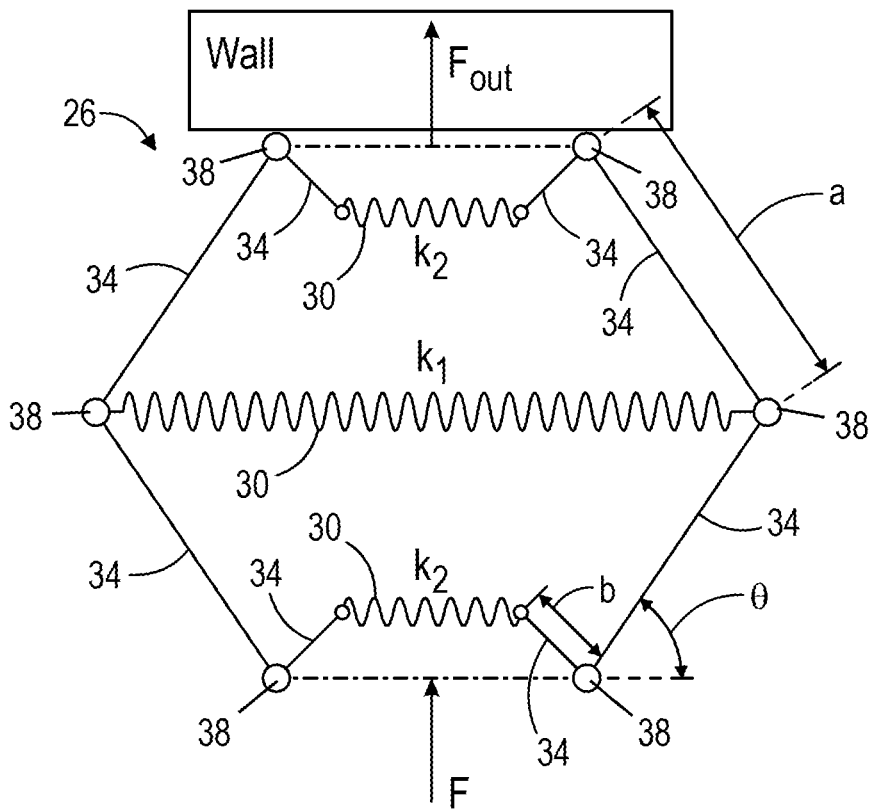
FIGS. 6A-6D illustrate static analysis of the metamaterial framework when the metamaterial framework is against a wall.
Figure 6B:
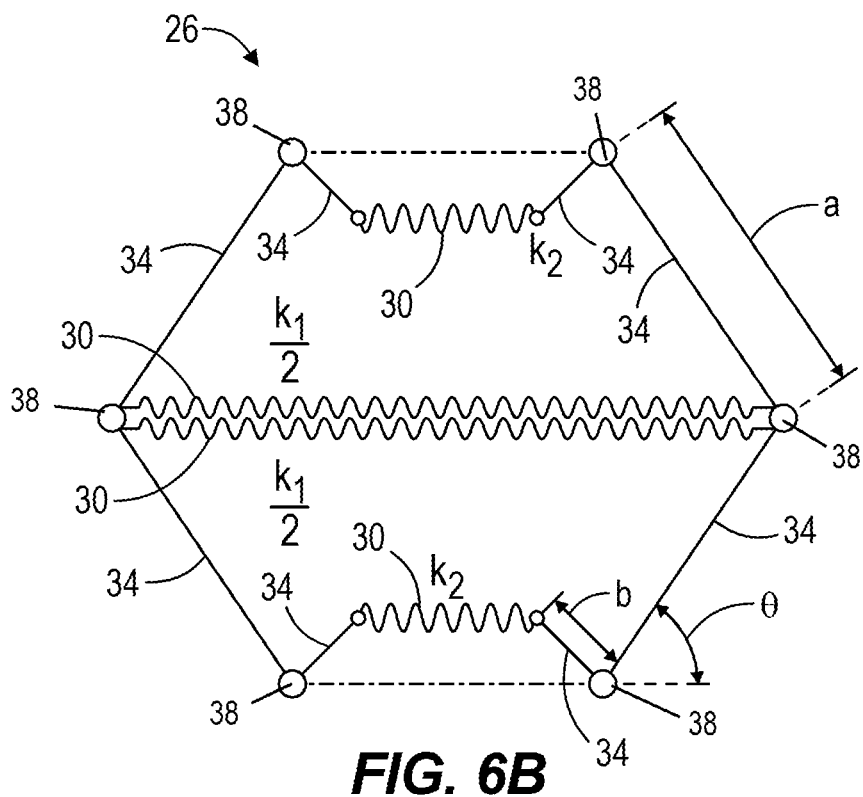
Figure 6C:
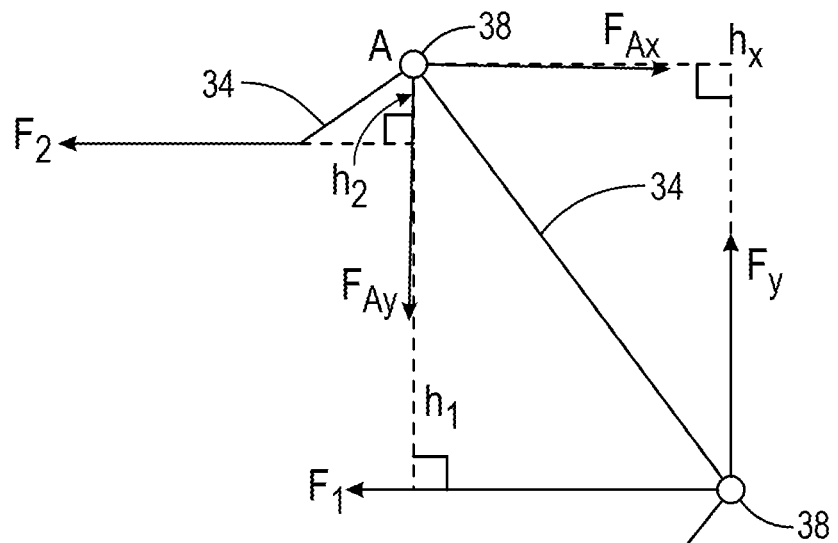
Figure 6D:
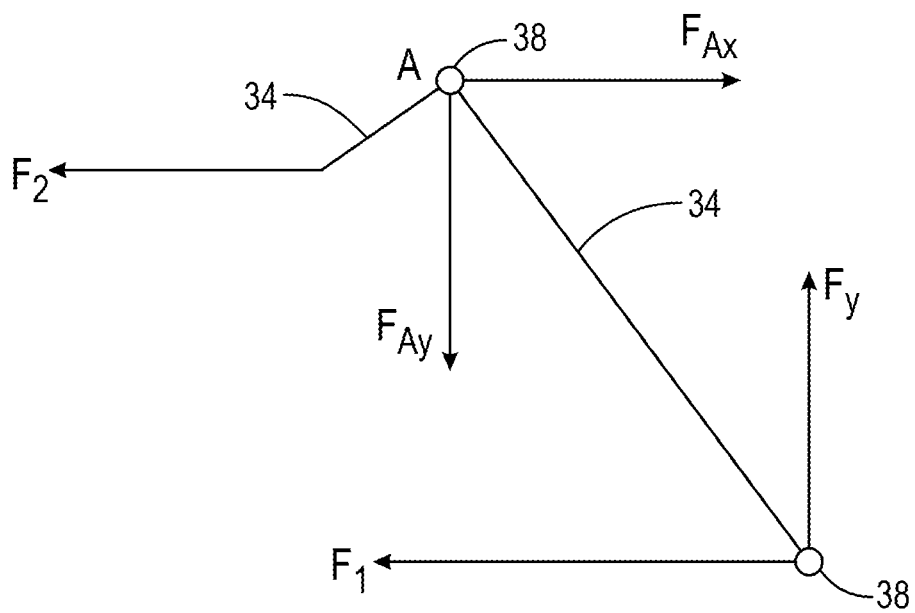

FIGS. 6A-6D illustrate static analysis of the unit cell 26 of the metamaterial framework 14 when the metamaterial framework 14 was against a wall. The mass of the unit cell 26 of the mechanical metamaterial framework 14 was ignored. It was assumed that an input force $F_{in}$ was applied on the metamaterial framework 14 and a fixed displacement boundary condition (i.e., a wall) was used to describe a static payload. FIGS. 6A and 6B show the configuration at angle θ. To simplify the analysis, the spring $k_1$ was split into two identical springs with stiffness of $k_1/2$, as shown in FIG. 6B. Due to symmetry, only half of the configuration was considered (FIG. 6C). The moment balance at point A is given by.

$$F_1 \cdot h_1 + F_2 \cdot h_2 - F_y \cdot h_x = 0 \quad (1)$$

The forces in the springs can be calculated by:

$$F_1 = k_1 a \cos\theta \quad (2)$$

$$F_2 = 2k_2 b(1 - \sin\theta) \quad (3)$$

Substituting Eqs. (2) and (3) into (1), and considering the requirement $$\frac{k_1}{k_2} = 2\left(\frac{b}{a}\right)^2$$

$$F_y = k_1 a \quad (4)$$

By analyzing the force balance at point A (FIG. 6D), one obtains $$F_{Ay} = F_y = k_1 a \quad (5)$$

$$F_{out} = 2F_{Ay} = 2ak_1 \quad (6)$$

This shows a constant output force, independent to θ.

Dynamic analysis of the mechanical metamaterial framework 14 was performed using Lagrangian mechanics. The following dynamic analysis shows that the mass block Mg (i.e., payload 18) remained shielded by the mechanical metamaterial framework 14 subjected to dynamic loading. Lagrangian mechanics was used. The generalized coordinates q are vertical coordinate y and rotational angle θ, (i.e., q={y,θ}). The same geometrical parameters and spring constants as that in FIG. 4B were used. For the sake of conciseness, the mass of the metamaterial was considered at the centroid.

Figure 12:
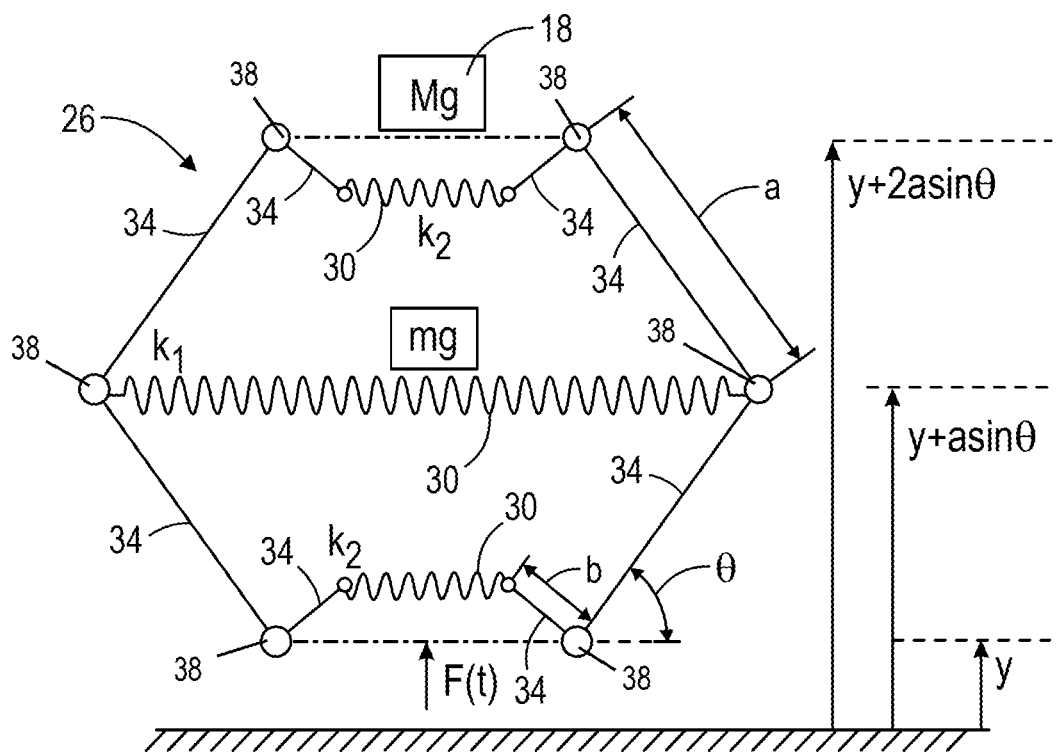
FIG. 12 illustrates dynamic analysis of a mechanical metamaterial unit cell when the gravitational potential energy presents using the Lagrangian mechanics.

FIG. 12 illustrates dynamic analysis of the unit cell 26 of the mechanical metamaterial framework 14 when gravitational potential energy is present, using Lagrangian mechanics.

The kinetic energy T and potential energy U of the composite are given by $$T = \frac{1}{2} m \left[\frac{d}{dt}(y + a\sin\theta)\right]^2 + \frac{1}{2} M \left[\frac{d}{dt}(y + 2a\sin\theta)\right]^2 \quad (7)$$

$$U = Mg(y + 2a\sin\theta) + mg(y + a\sin\theta) + 4b^2 k_2 (1 - \sin\theta)^2 + 2a^2 k_1 \cdot \cos^2\theta \quad (8)$$

The Lagrange function is $$L = T - U \quad (9)$$

Substitute Eq. (9) into the Lagrange equation $$\frac{d}{dt}\left(\frac{\partial L}{\partial \dot{q}_j}\right) - \frac{\partial L}{\partial q_j} = Q_{q_j} \quad (10)$$

where $Q_{q_j} = \{F(t), 0\}$, is the generalized force, use the two requirements for constant force in the static analysis as discussed in the main text, namely (1) and $$\frac{k_1}{k_2} = 2\left(\frac{b}{a}\right)^2,$$

(2):

$$k_1 = \frac{(2M + m)g}{4a}$$

Two equations of motion are yielded in y- and θ-directions:

$$m(\ddot{y} - a\sin\theta\cdot\dot{\theta}^2 + a\cos\theta\cdot\ddot{\theta}) + M(\ddot{y} - 2a\sin\theta\cdot\dot{\theta}^2 + 2a\cos\theta\cdot\ddot{\theta}) + (m+M)g = F(t) \quad (11)$$

$$\frac{d}{dt}\left[\frac{m}{2M}(\dot{y} + a\cos\theta\cdot\dot{\theta}) + (\dot{y} + 2a\cos\theta\cdot\dot{\theta})\right] = 0 \quad (12)$$

Using initial conditions $y|_{t=0}=0$, $\dot{y}|_{t=0}=0$, $\theta|_{t=0}$=any angle between 0 and $$\frac{\pi}{2},$$

and $\dot{\theta}|_{t=0}=0$, Eq. (12) becomes $$\frac{m}{2M}(\dot{y} + a\cos\theta\cdot\dot{\theta}) + (\dot{y} + 2a\cos\theta\cdot\dot{\theta}) \equiv 0 \quad (13)$$

Eq. (13) leads to $$\frac{m}{2M}(y + a\sin\theta) + (y + 2a\sin\theta) \equiv \text{constant} \quad (14)$$

It is clear from Eq. (14) that, if the mass of metamaterial m is much smaller than the mass of the dead load M, $$y + 2a\sin\theta = \text{constant} \quad (15)$$

suggesting a stationary position of the payload under dynamic force F(I) The metamaterial shields the input force. Apply Eq. (14) on Eq. (11), the equation of motion in y-direction can be rewritten as $$F(t) = (m+M)g + \frac{m}{2}\left(\ddot{y} - a\cdot\sin\theta\cdot\dot{\theta}^2 + a\cos\theta\cdot\ddot{\theta}\right) \quad (16)$$

A genetic algorithm was used to discover possible structure(s) that could function as a perfect energy shield based on the mechanism that the input energy only circulates between the metamaterial framework 14 and the energy source 22. A hexagon with side length $a_0$ was selected for the metamaterial framework 14 or unit cell 26 of a metamaterial framework 14. The trusses were classified into three types, horizontal ones, lateral ones, and shorter legs. A lateral one and a shorter leg form a single piece, while pins (pivot points) at A to F allow the truss structure to deform (see (b) at FIG. 7). The design variables (e.g., a mass M and three springs $k_1$, $k_2$, $k_3$) describe the components of this structure and their relative locations through angles $\theta_1$ and $\theta_2$. The connectivity of the springs is described by other design variables, such as $a_1$, $b_1$, and $c_1$ ((a) at FIG. 7). A vanishing design variable, e.g., $k_3=0$, indicates that this component does not exist. The only state variable is angle θ, describing the deformation/locations of the components. The geometrical compatibility conditions are listed in equation 17.

All springs are in their free state at the initial configuration shown in (a) at FIG. 7. The masses of the springs and metamaterial framework 14 were not considered. The objective was to achieve a perfect isolation of vibration energy over full frequency band, so quasi-static analysis (f≈0 Hz) was carried out to obtain necessary conditions of the structure. In this case, the mechanical metamaterial framework 14 was in equilibrium at all instants and there was no kinetic energy in the system. The supporting force F(t)=Mg and the work done by F(t) is calculated by $W_{input}=Mg(2a_0-2a_0\sin\theta)$. The input energy is blocked away from the top surface of the metamaterial framework 14, meaning the payload 18 will keep static, as shown in (b) at FIG. 7. Therefore, $W_{input}$ totally transforms into potential energy of the metamaterial framework 14, which includes the gravitational potential energy and spring energies, $E_1$, $E_2$, and $E_3$.

The inventors sought to find all possible combinations of the design variables $\{k_1, k_2, a_1, a_2, b_1, b_2, a_0, \theta_1, \theta_2, M, c_1, c_2, k_3\}$ to minimize the difference between the total input energy W(t) and the change of potential energy of the metamaterial—D(θ), with respect to the state variable θ and bearing the geometrical compatibility constraints, $$\begin{cases} b_1 + b_2 + \sqrt{(b_2\cos\theta_2 - b_1\cos\theta_1)^2 + (a_0 - b_1\sin\theta_1 - b_2\sin\theta_2)^2} \geq a_0 \\ a_0 + b_2 + \sqrt{(b_2\cos\theta_2 - b_1\cos\theta_1)^2 + (a_0 - b_1\sin\theta_1 - b_2\sin\theta_2)^2} \geq b_1 \\ a_0 + b_1 + \sqrt{(b_2\cos\theta_2 - b_1\cos\theta_1)^2 + (a_0 - b_1\sin\theta_1 - b_2\sin\theta_2)^2} \geq b_2 \\ a_0 + b_1 + b_2 \geq \sqrt{(b_2\cos\theta_2 - b_1\cos\theta_1)^2 + (a_0 - b_1\sin\theta_1 - b_2\sin\theta_2)^2} \end{cases} \quad (17)$$

The spring energies, $E_1$, $E_2$, and $E_3$ could be calculated by:

$$E_1 = 2\cdot\frac{k_1}{2}\cdot\left[\sqrt{(a_1\cos\theta + a_2\cos\theta + a_0)^2 + (a_1\sin\theta - a_2\sin\theta)^2} - \sqrt{a_0^2 + (a_1-a_2)^2}\right]^2 \quad (18)$$

$$E_2 = 2\cdot\frac{k_2}{2}\cdot\left\{\sqrt{\begin{array}{l}([b_2\sin(\theta+\theta_2) - b_1\sin(\theta+\theta_1)] + \\ [a_0 + b_2\cos(\theta+\theta_2) + b_1\cos(\theta+\theta_1)]^2\end{array}} - \sqrt{\begin{array}{l}((b_2\cos\theta_2 - b_1\cos\theta_1)^2 + \\ (a_0 - b_1\sin\theta_1 - b_2\sin\theta_2)^2\end{array}}\right\}^2 \quad (19)$$

$$E_3 = \frac{k_3}{2}\left[\sqrt{(c_1-c_2)^2 + 2a_0\sin\theta^2} - \sqrt{(c_1-c_2)^2 + (2a_0)^2}\right]^2 \quad (20)$$

From D(θ)=0, we have:

$$D(\theta) = k_1\left[\sqrt{((a_1\cos\theta + a_2\cos\theta + a_0)^2 + (a_1\sin\theta - a_2\sin\theta)^2)} - \sqrt{a_0^2 + (a_1-a_2)^2}\right]^2 + \\ k_2\left\{\sqrt{\begin{array}{l}([b_2\sin(\theta+\theta_2) - b_1\sin(\theta+\theta_1)] + \\ [a_0 + b_2\cos(\theta+\theta_2) + b_1\cos(\theta+\theta_1)]^2)\end{array}} - \sqrt{((b_2\cos\theta_2 - b_1\cos\theta_1)^2 + (a_0 - b_1\sin\theta_1 - b_2\sin\theta_2)^2)}\right\}^2 + \\ \frac{k_3}{2}\left[\sqrt{(c_1-c_2)^2 + 2a_0\sin\theta^2} - \sqrt{(c_1-c_2)^2 + (2a_0)^2}\right]^2 + \\ 2Mga_0\sin\theta - 2Mga_0 = 0 \quad (21)$$

for all θ∈[0, 90°]. Thus, $f=\Sigma D(\theta_i)^2$ was selected as the fitness function for the genetic algorithm. Here, to ensure a high calculation accuracy, i was varied from 0 to 100, and the increment of $\theta_i$ to $\theta_{i+1}$ was 0.9°.

The Global Optimization Toolbox™ in MATLAB® was used to implement the genetic algorithm. A prescribed mass of the payload was 7 kg and the length of the hexagon was 0.09 m. The range of other design variables was:

$$\begin{cases} k_1 \in [0, 2000]\, N/m \\ k_2 \in [0, 2000]\, N/m \\ k_3 \in [0, 2000]\, N/m \\ a_1 \in [0.01, 0.09]\, m \\ a_2 \in [0.01, 0.09]\, m \\ b_1 \in [0.01, 0.045]\, m \\ b_2 \in [0.01, 0.045]\, m \\ c_1 \in [0.01, 0.045]\, m \\ c_2 \in [0.01, 0.045]\, m \\ \theta_1 \in [45°, 90°] \\ \theta_2 \in [45°, 90°] \end{cases}$$

Since there were 11 parameters to be determined and the values of them have a relatively large variation range, six steps of genetic algorithm were performed to achieve convergent results. From step 1 ((a) at FIG. 8), it was observed that $c_1$ is approximately equal to $c_2$ for the best individual after 1,000 generations. The inventors let $c_1=c_2=0.045$ m ($=a_0/2$) for the subsequent steps. From step 2 ((b) at FIG. 8), it seems $\theta_1=\theta_2$. Inspired by previously proposed model shown in FIG. 4B, the inventors let $\theta_1=\theta_2=90°$ for the subsequent steps. From step 3 ((c) at FIG. 8) the inventors could determine that $a_1$ was approximately the same value of $a_2$. From the configuration the inventors obtained in (c) at FIG. 8, it was determined that when $a_1=a_2=0.09$ m, two springs $k_1$ can merge together with the value $k_1$ doubled and only three springs will be used for the subsequent steps. Thus, in the fourth step ((d) at FIG. 8), $a_1=a_2=0.09$ m, by concluding the best individuals of 1,000 generations, the value of $k_1$ was determined around 194.44 N/m, which became a fixed value for the subsequent steps ((e) and (f) of FIG. 8). Upon finishing the sixth step ((f) of FIG. 8), the fitness function was extremely small. If the inventors set $k_3=0$, a model shown in (g) of FIG. 8 was obtained, corresponding to FIG. 4B. If the inventors set k=0, which gives another model shown in (h) of FIG. 8. Both the configurations of (g) and (h) of FIG. 8 have $\theta_1=\theta_2=90°$.

Actually, after a simple analysis, it is easy to find out that if $\theta_1=\theta_2=270°$, the structure also can work as a perfect energy shield ((i) of FIG. 8). In summary, after a series of genetic algorithm calculations, three types of structures were obtained that could perfectly isolate the input energy from the environment, whose geometrical conditions and initial/deformed configurations are shown in (g), (h), and (i) of FIG. 8.

Considering the practical engineering application, the following requirements were needed to select an optimal combination of design parameters: (1) an extension spring, (2) less components, and (3) symmetric structure to ensure the stability of the model. By applying these constraints, the inventors chose type ①, and the two horizontal springs were merged together with the value doubled ($k_1'=2k_1$).

Figure 13:
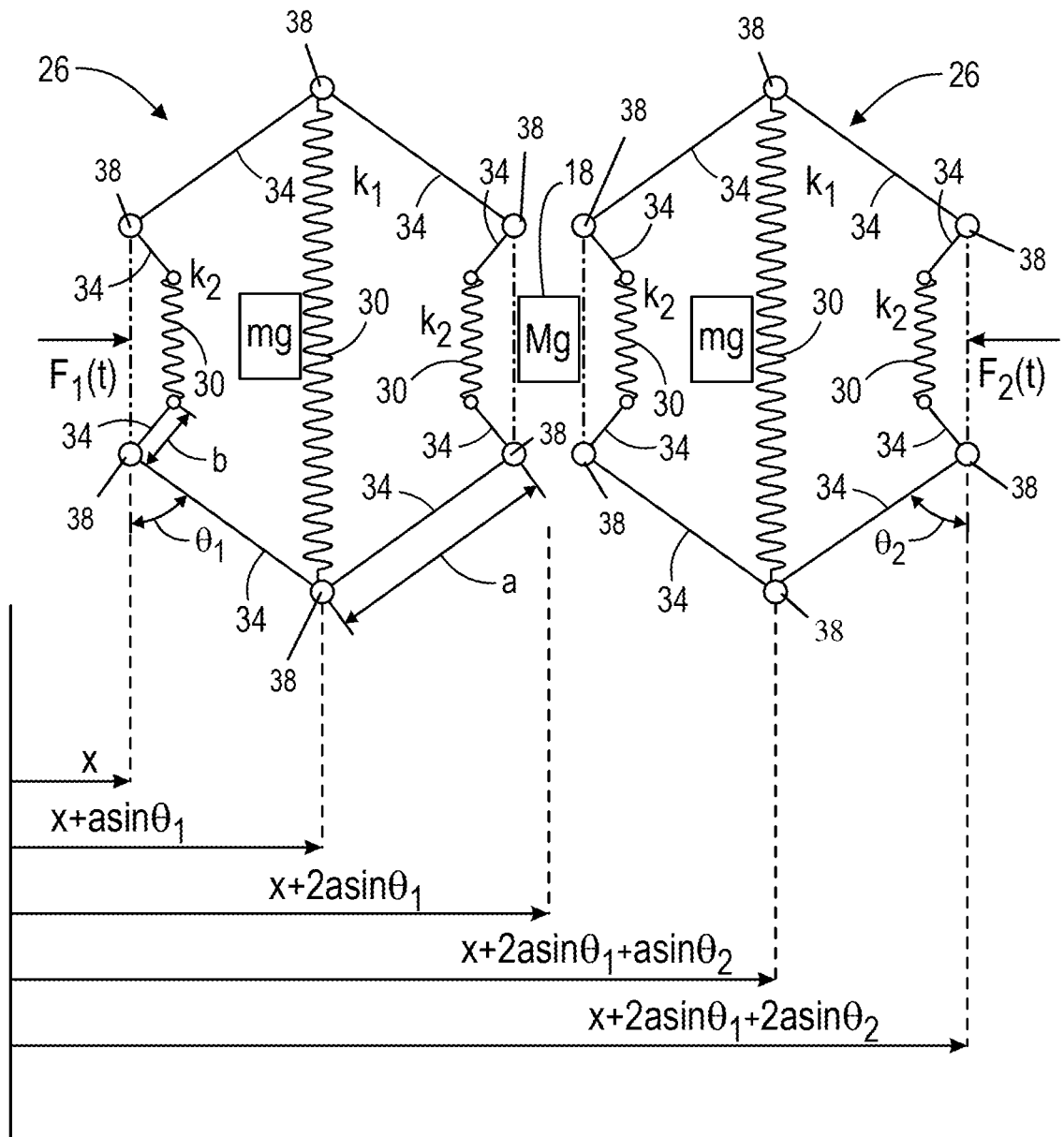
FIG. 13 illustrates dynamic analysis of two mechanical metamaterial unit cells using Lagrangian mechanics to shield energy in the horizontal direction, in accordance with some embodiments.

FIG. 13 illustrates dynamic analysis of two mechanical metamaterial frameworks 14 (e.g., separated unit cells 26) using Lagrangian mechanics to shield energy in the horizontal direction.

The schematic of two metamaterial frameworks 14 to shield the energy in the horizontal direction is shown in FIG. 13. The masses of payload 18 and the metamaterial frameworks 14 are M and m, respectively. The generalized coordinates q are horizontal coordinate x and rotational angle $\theta_1$ and $\theta_2$, i.e., $q=\{x,\theta_1,\theta_2\}$. The same geometry parameters and spring constants as that used in FIG. 4B were used in FIG. 13 and the mass of the metamaterial framework 14 was also considered at the centroid.

The kinetic energy T and potential energy U of the composite are given by:

$$T = \frac{m}{2}\left[\frac{d}{dt}(x+a\sin\theta_1)\right]^2 + \tag{22}$$
$$\frac{M}{2}\left[\frac{d}{dt}(x+2a\sin\theta_1)\right]^2 + \frac{m}{2}\left[\frac{d}{dt}(x+2a\sin\theta_1+a\sin\theta_2)\right]^2 =$$
$$\frac{m}{2}(\dot{x}+a\cos\theta_1\cdot\dot\theta_1)^2 + \frac{M}{2}(\dot{x}+2a\cos\theta_1\cdot\dot\theta_1)^2 +$$
$$\frac{m}{2}(\dot{x}+2a\cos\theta_1\cdot\dot\theta_1+a\cos\theta_1\cdot\dot\theta_1)^2$$

$$U = \frac{k_1}{2}(2a\cos\theta_1)^2 + 2\cdot\frac{k_2}{2}[2b(1-\sin\theta_1)]^2 + \tag{23}$$
$$\frac{k_1}{2}(2a\cos\theta_2)^2 + 2\cdot\frac{k_2}{2}[2b(1-\sin\theta_2)]^2 =$$
$$2a^2k_1(\cos^2\theta_1+\cos^2\theta_2)+4b^2k_2[(1-\sin\theta_1)^2+(1-\sin\theta_2)^2]$$

Since $$\frac{k_1}{k_2} = 2\left(\frac{b}{a}\right)^2,$$

Eq. (23) becomes $$U=4a^2k_1(1-\sin\theta_1\sin\theta_2) \tag{24}$$

The Lagrange function is $$L=T-U \tag{25}$$

Apply the Lagrange equation $$\frac{d}{dt}\left(\frac{\partial L}{\partial \dot{q}_j}\right)-\frac{\partial L}{\partial q_j}=Q_{q_j} \tag{26}$$

Where $Q_{q_j}=\{F_1(t)-F_2(t), 0, 0\}$ is the generalized force, and one yields $$m(\ddot{x}+a\cos\theta_1\cdot\ddot\theta_1-a\sin\theta_1\cdot\dot\theta_1^2)+M(\ddot{x}+2a\cos\theta_1\cdot\ddot\theta_1-2a\sin\theta_1\cdot\dot\theta_1^2)+m(\ddot{x}+2a\cos\theta_1\cdot\ddot\theta_1-2a\sin\theta_1\cdot\dot\theta_1^2+a\cos\theta_2\cdot\ddot\theta_2-a\sin\theta_2\cdot\dot\theta_2^2)=F_1(t)-F_2(t) \tag{27}$$

$$m(\ddot{x}+a\cos\theta_1\cdot\ddot\theta_1-a\sin\theta_1\cdot\dot\theta_1^2)+2M(\ddot{x}+2a\cos\theta_1\cdot\ddot\theta_1-2a\sin\theta_1\cdot\dot\theta_1^2)+2m(\ddot{x}+2a\cos\theta_1\cdot\ddot\theta_1-2a\sin\theta_1\cdot\dot\theta_1^2+a\cos\theta_2\cdot\ddot\theta_2-a\sin\theta_2\cdot\dot\theta_2^2)-4ak_1=0 \tag{28}$$

$$m(\ddot{x}+2a\cos\theta_1\cdot\ddot\theta_1-2a\sin\theta_1\cdot\dot\theta_1^2+a\cos\theta_2\cdot\ddot\theta_2-a\sin\theta_2\cdot\dot\theta_2^2)-4ak_1=0 \tag{29}$$

Combining Eqs. (28) and (29), one obtains $$m(\ddot{x}+a\cos\theta_1\cdot\ddot\theta_1-a\sin\theta_1\cdot\dot\theta_1^2)+2M(\ddot{x}+2a\cos\theta_1\cdot\ddot\theta_1-2a\sin\theta_1\cdot\dot\theta_1^2)+m(\ddot{x}+2a\cos\theta_1\cdot\ddot\theta_1-2a\sin\theta_1\cdot\dot\theta_1^2+a\cos\theta_2\cdot\ddot\theta_2-a\sin\theta_2\cdot\dot\theta_2^2)=0 \tag{30}$$

Eq. (30) actually is $$\frac{d}{dt}[m(\dot{x}+a\cos\theta_1\cdot\dot\theta_1)+ \tag{31}$$
$$2M(\dot{x}+2a\cos\theta_1\cdot\dot\theta_1)+m(\dot{x}+2a\cos\theta_1\cdot\dot\theta_1+a\cos\theta_2\cdot\dot\theta_2)]=0$$

Using initial conditions $\dot{x}|_{t=0}=0$, $\dot\theta_1|_{t=0}=0$, and $\dot\theta_2|_{t=0}=0$, Eq. (31) becomes $$m(\ddot{x}+a\cos\theta_1\dot\theta_1)+2M(\ddot{x}+2a\cos\theta_1\dot\theta_1)+m(\ddot{x}+2a\cos\theta_1\dot\theta_1+a\cos\theta_2\dot\theta_2)=0 \tag{32}$$

Eq. (32) actually is $$\frac{d}{dt}[m(x+a\sin\theta_1)+2M(x+2a\sin\theta_1)+m(x+2a\sin\theta_1+a\sin\theta_2)]=0 \quad (33)$$

Using initial conditions $x|_{t=0}=x_0$, $\theta_1|_{t=0}=\theta_{10}$, and $\theta_2|_{t=0}=\theta_{20}$, Eq. (33) becomes $$(x+2a\sin\theta_1)+\frac{m}{2M}(x+a\sin\theta_1)+\frac{m}{2M}(x+2a\sin\theta_1+a\sin\theta_2)=\text{constant} \quad (34)$$

From Eq. (34), if the mass of metamaterial m is much smaller than the mass of the dead load M, $$x+2a\sin\theta_1=\text{constant} \quad (35)$$

suggesting a stationary position of the payload under dynamic force $F_1(t)$ and $F_2(t)$. The metamaterial shields the input force.

Applying Eq. (28) to Eq. (27), and using $$k_1=\frac{(2M+m)g}{4a},$$

the relationship between $F_1(t)$ and $F_2(t)$ can be rewritten as $$F_1(t)-F_2(t)=\left(M+\frac{m}{2}\right)g+\frac{m}{2}\left(\ddot{x}+a\cos\theta_1\cdot\ddot{\theta}_1-a\sin\theta_1\cdot\dot{\theta}_1^2\right) \quad (36)$$

Figure 14A:
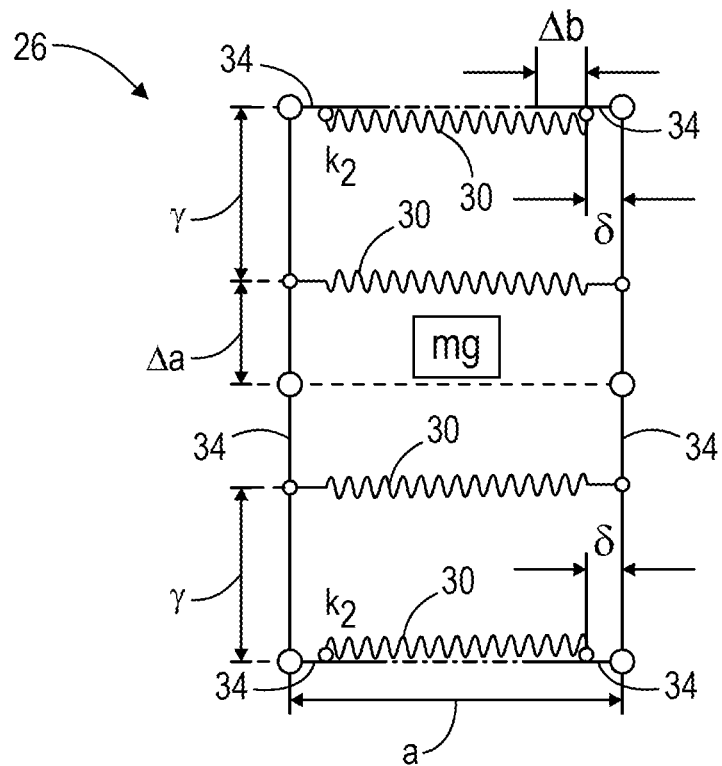
FIGS. 14A-14E illustrate the design of mechanical metamaterials with adjustable payload, in accordance with some embodiments.
Figure 14B:
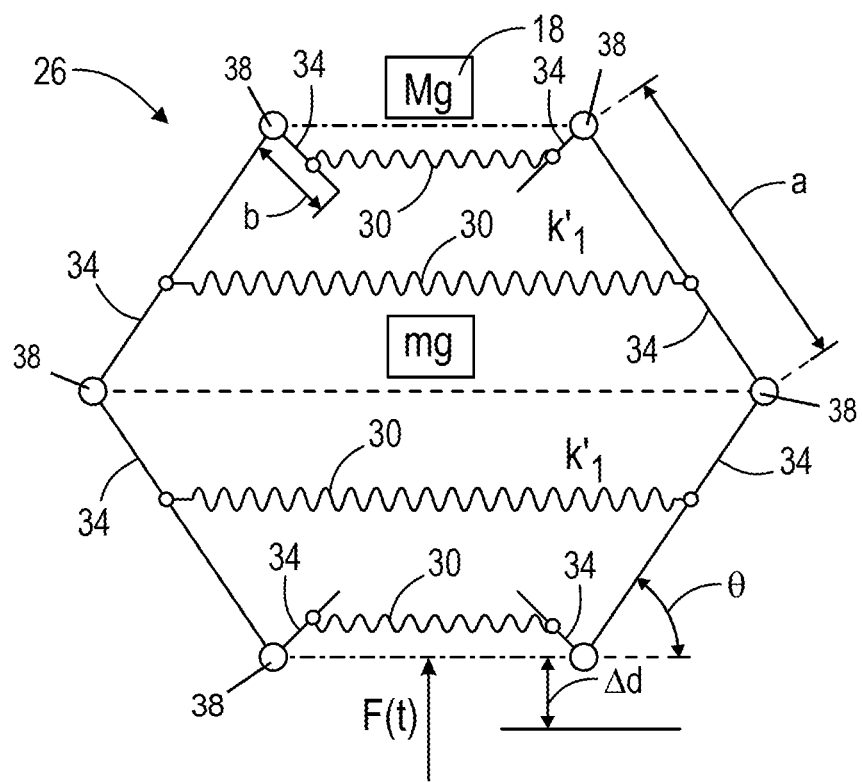
Figure 14C:
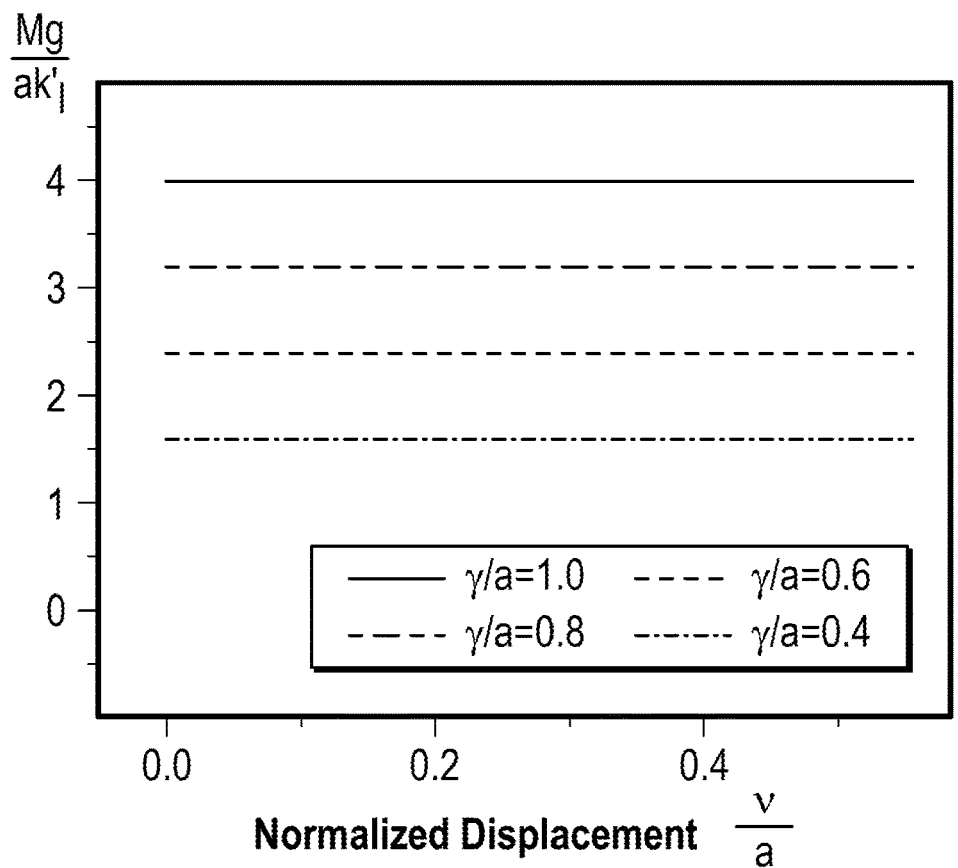
Figure 14D:
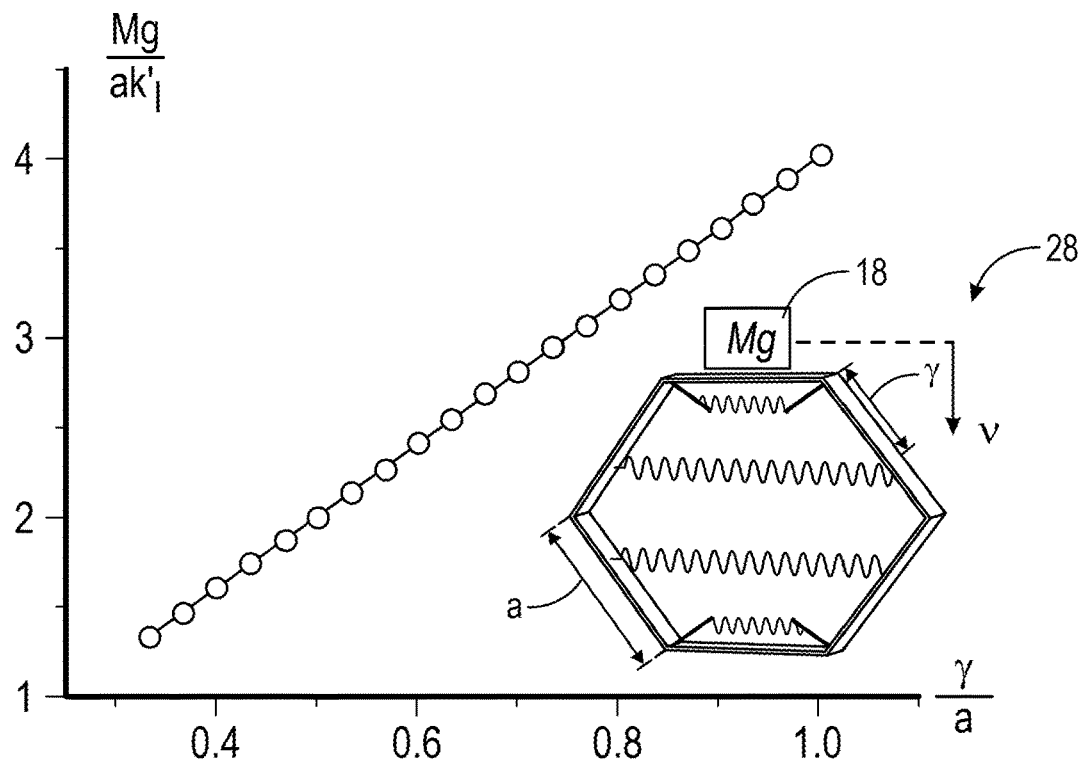
Figure 14E:
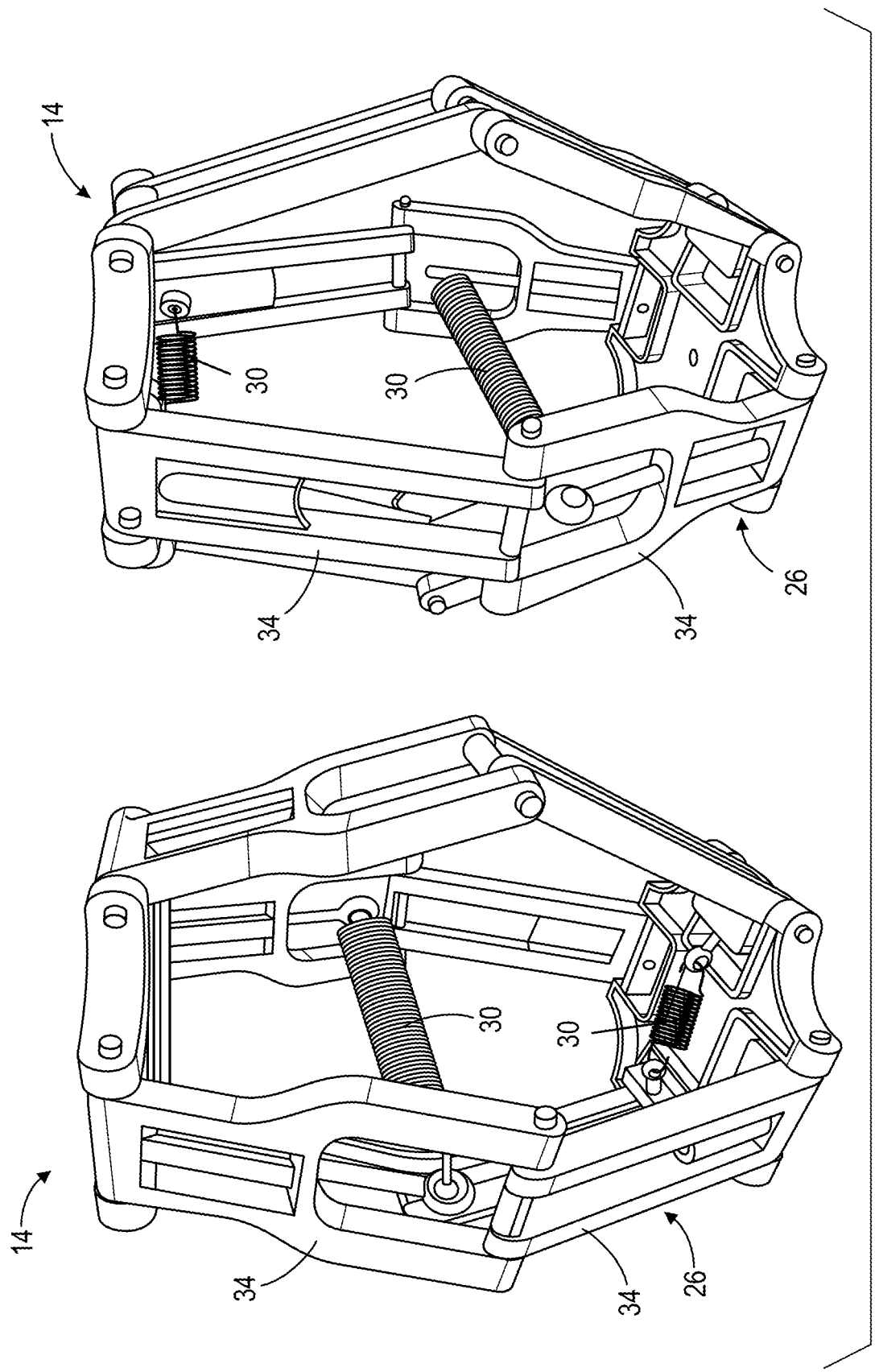

Mechanical metamaterial frameworks 14 can be designed for tunability with two more adjustable parameters. FIGS. 14A-14E illustrate a design of mechanical metamaterial frameworks 14 with adjustable exerted force. In FIGS. 14A and 14B, two new design parameters $\Delta a$ and $\Delta b$ are introduced to describe the positions of the springs. FIG. 14C shows constant and adjustable exerted force. FIG. 14D shows a linear relationship between the constant, adjustable exerted force, and the adjustable position of the spring. FIG. 14E includes images of the fabricated metamaterials with tunable exerted force (only one longer spring $k_1'$ and one shorter spring $k_2$ were mounted).

In some embodiments, to shield the force from the payload Mg in the vertical direction when the gravitational potential is presented, the present mechanical metamaterial frameworks 14 need to satisfy one requirement, i.e., $2ak_1=Mg$. In other words, a given geometry (FIGS. 14A and 14B) and spring constants ($k_1$ and $k_2$) can only shield a payload 18 with specific weight Mg. Here two new design parameters $\Delta a$ and $\Delta b$ are introduced for tunable weight or tunable exerted force (as shown in FIG. 14A). Now the location of the four springs can be adjusted and characterized by $\Delta a$ and $\Delta b$. A similar quasi-static analysis was conducted to show that this design also provides a constant force output. $\Delta a$ and $\Delta b$ in FIG. 14A denote the deviation of the position of springs from their original positions as shown in FIG. 4B $\Delta a=0$ when two central springs are together and $\Delta b=0$ when two short springs go to their original positions.

As shown in FIG. 14A, the length of each rod is exactly the same as with the previous design. The only difference is that, the original spring with stiffness $k_1$ is split into two identical springs with stiffness of $k_1/2$, and here we note it as $k_1'$, whose initial length is still a. The initial length of the short springs with stiffness of $k_2$ is a−2b. FIG. 14B shows the configuration of the metamaterial framework 14 at an arbitrary position when the bottom of the metamaterial framework 14 moves by a distance $\Delta d$. The mass of the metamaterial framework 14 is m. The angle between the long rod and the horizontal line is θ, which ranges from 0 to 90°. The applied force on the bottom of metamaterial framework 14 is noted as F(t). Since it is a quasi-static process, it is easy to know that $F(t)=(M+m)g$. The objective is to keep the payload 18 (i.e., mass block Mg) static all the time, so it is easy to determine that all the work done by F(t) totally transfers into the potential energy of the metamaterial framework 14, which includes the gravitational potential energy of the metamaterial framework 14 and the potential energy of the springs. To simplify the calculation set: $\delta=b-\Delta b$, and $\gamma=a-\Delta a$. The increase of total potential energy of the metamaterial shown in FIG. 14B is $$W_{potential}=mga(1-\sin\theta)+4k_2(b-\delta\sin\theta)^2+4\gamma^2 k_1'\cos^2\theta \quad (37)$$

With the position of the payload Mg not changing, then $\Delta d=2a(1-\sin\theta)$, so the work done by F(t) can be calculated by:

$$W_{input}=F(t)\cdot\Delta d=2(M+m)ag(1-\sin\theta) \quad (38)$$

Equate Eqs. (37) and (38), one obtains $$2(M+m)ag(1-\sin\theta)=mga(1-\sin\theta)+4k_2(b-d\sin\theta)+4\gamma k_1'\cos^2\theta \quad (39)$$

Eq. (39) must be valid for all θ, which leads to two requirements $$\frac{k_1}{k_2}=2\left(\frac{b}{a}\right)^2=2\left(\frac{\delta}{\gamma}\right)^2=2\left(\frac{b-\Delta b}{a-\Delta a}\right)^2 \quad (40)$$

$$(2M+m)g=8k_1'(a-\Delta a)=4k_1(a-\Delta a) \quad (41)$$

Eqs. (40) and (41) show that by adjusting the locations of these four springs by following this relationship, the constant exerted force can be tuned. Though two parameters are introduced, only one is independent. When the mass in of the metamaterial framework 14 is much less than the mass of the object M, in can be ignored, and Eq. (41) becomes:

$$Mg=4k_1'(a-\Delta a)=2k_1(a-\Delta a) \quad (42)$$

In FIG. 14C, the normalized exerted force $$\frac{Mg}{ak_1'}$$

remains constant with the vertical displacement and varies as the changing positions of the central springs. When the two central springs are tied together at the center, i.e. $\Delta a=0$, $Mg=4k_1'(a-\Delta a)=2k_1(a-\Delta a)=2ak_1$, meaning that the exerted force reaches maximum and is identical to the original design given by FIG. 4B. FIG. 14D shows that the normalized constant exerted force linearly depends on γ/a. FIG. 14E shows the fabricated metamaterial with tunable but still constant exerted force.

Figure 15A:
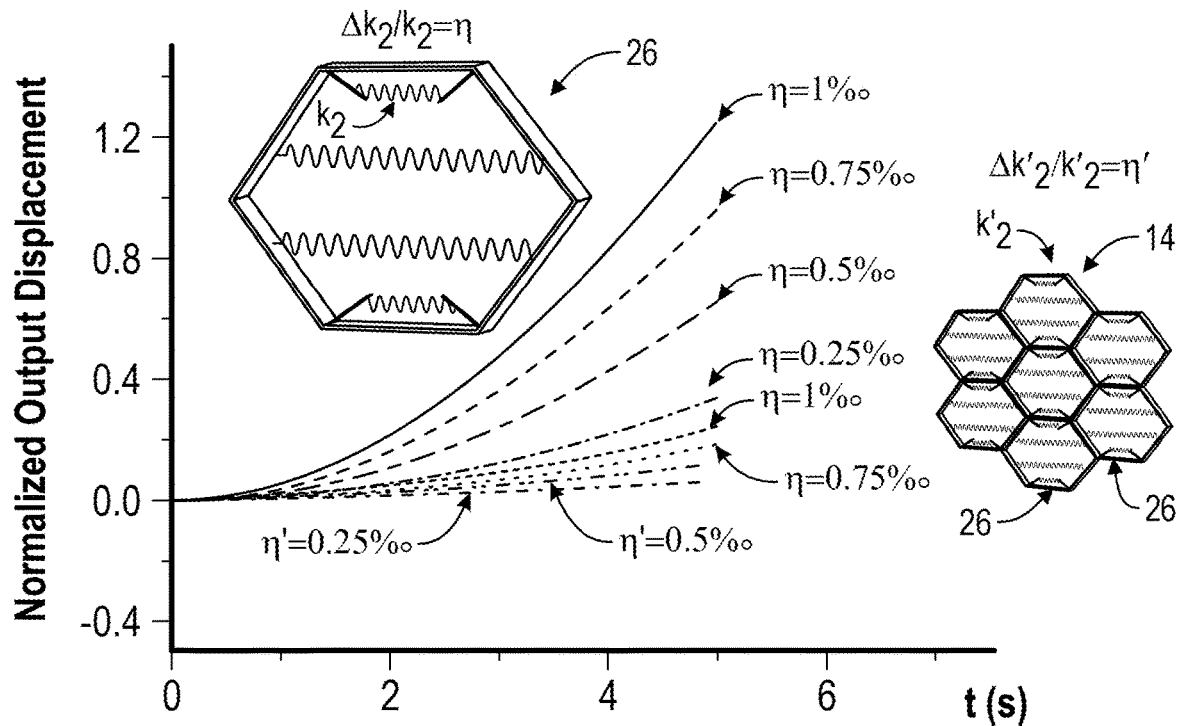
FIGS. 15A-15D illustrate a comparison of simulated-isolation performance of a metamaterial unit cell and a metamaterial array at 1 Hz, in accordance with some embodiments.
Figure 15B:
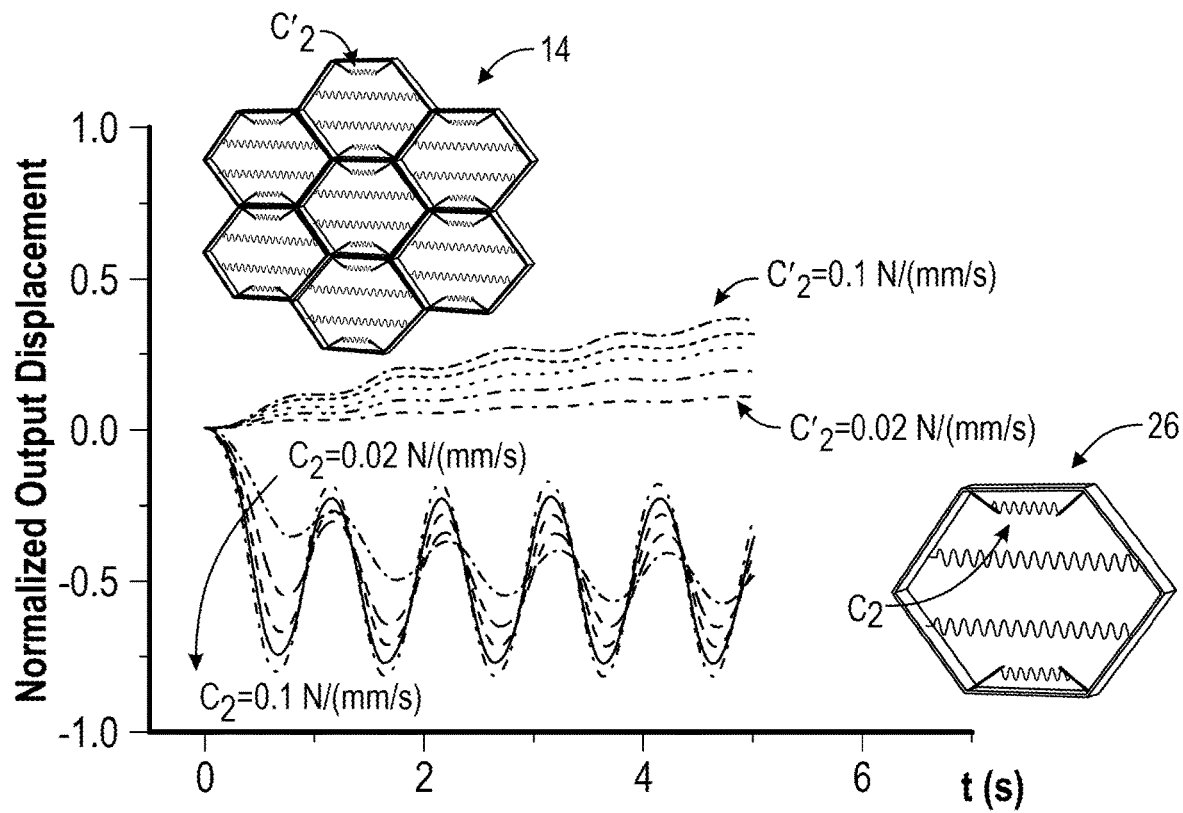
Figure 15C:
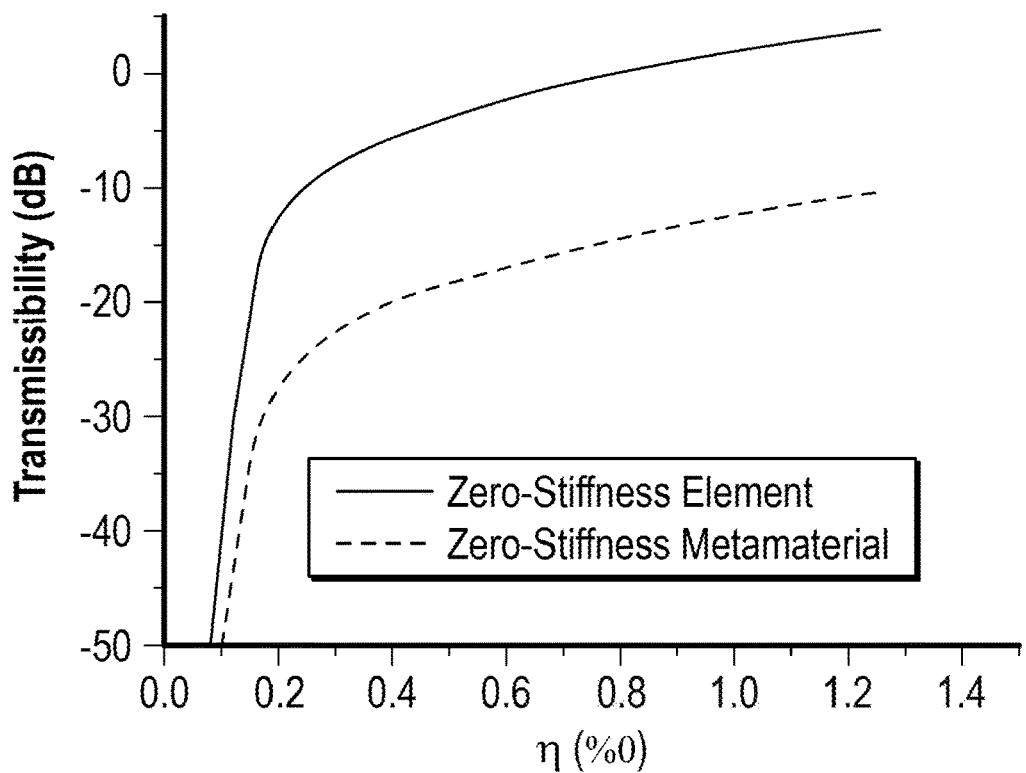
Figure 15D:
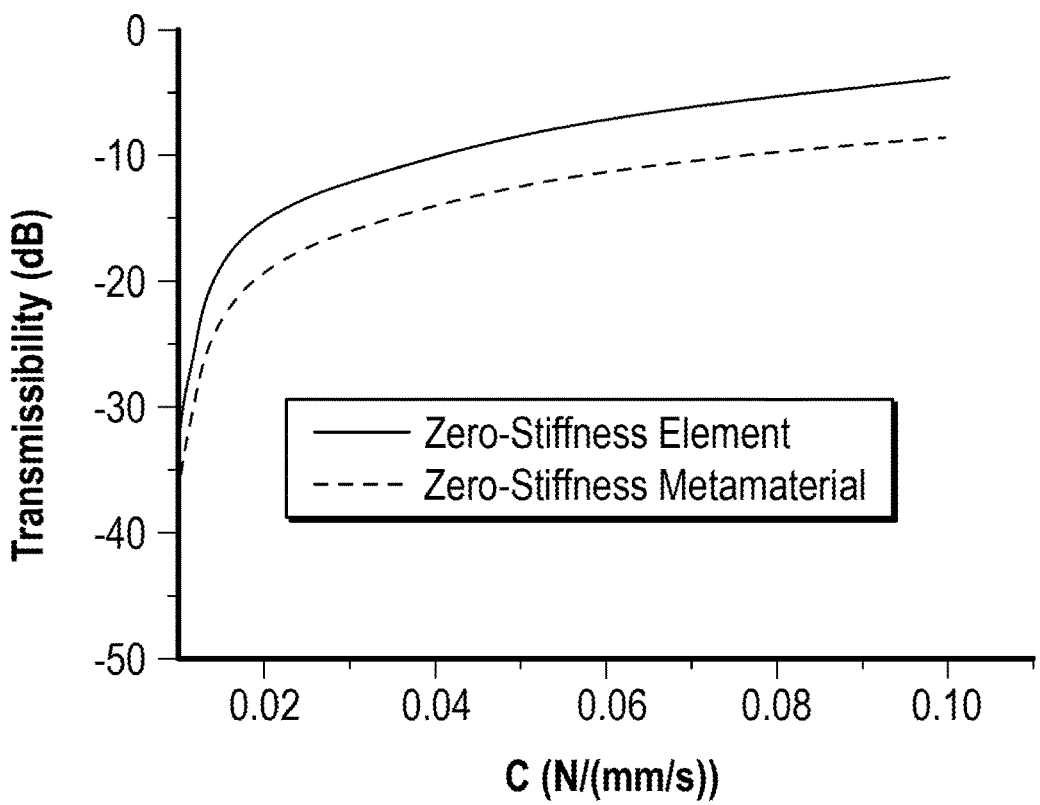

Multiple mechanical metamaterial unit cells 26 or frameworks 14 can be assembled to form an array. Compared with a one unit cell 26, an array of cells 26 has merits on insensitivity to some manufacturing uncertainties since the discrepancies among elements can be attenuated by the metamaterials array and load bearing capacity could be greatly improved. Besides, the reliability of the system could also be enhanced since, as shown by the simulation results in FIGS. 15A-15D. The introduction of a damping coefficient C and deviation of spring stiffness $\Delta k_2$ will cause a much greater damage on the performance of the element than the metamaterial. FIG. 15A illustrates the normalized output displacement when an uncertainty of stiffness was introduced into one of shorter springs in a metamaterial unit cell $$\left(\eta = \frac{\Delta k_2}{k_2}\right)$$

and a metamaterial array $$\left(\eta' = \frac{\Delta k_2'}{k_2'}\right),$$

respectively. Both $\eta$ and $\eta'$ varied from 0.25‰ to 1‰. FIG. 15B illustrates the normalized output displacement when damping of one of shorter springs was introduced into a metamaterial unit cell ($C_2$) and a metamaterial array ($C_2'$), respectively. Both $C_2$ and $C_2'$ varied from 0.02 to 0.1 N/(mm/s). FIG. 15C illustrates the change of the transmissibility of a metamaterial unit cell 26 and a metamaterial array with the increase of 17. FIG. 15D illustrates the change of the transmissibility of a metamaterial unit cell 26 and a metamaterial array with the increase of C.

FIG. 11 illustrates an electro-mechanical metamaterial, including charges Q on the bottom and upper plates of the isolator and springs $k_1$ and $k_2$. When the metamaterial is compressed with an angle $\theta$, the capacity of the element is calculated by:

$$C = \frac{\varepsilon S}{4\pi k d} \quad (43)$$

where $d=2a \sin \theta$, and $k=9\times10^9$ N·m$^2$/C$^2$, $\varepsilon=1$. The electrical potential energy of the metamaterial is given by:

$$E_{electric} = \frac{Q^2}{2C} = \frac{2\pi k}{\varepsilon S} \cdot Q^2 \cdot d \quad (44)$$

Here, $S=aL$, with L the out-of-plane length of the element. Let $$B = \frac{2\pi k}{\varepsilon S}$$

and Eq. (44) is written by:

$$E_{electric} = B \cdot Q^2 \cdot d \quad (45)$$

The mass of the metamaterial framework 14 is also considered. In some embodiments, the potential energy of the metamaterial must be conserved to shield the input energy. So the following equation must be satisfied:

$$\Delta E_{electric} + \Delta E_{elastic} + \Delta E_{gravitational} = 0 \quad (46)$$

Which is $$4b^2 k_2(1-\sin \theta)^2 + 2a^2 k_1 \cos^2 \theta - BQ^2 2a(1-\sin \theta) - mga(1-\sin \theta) = 0 \quad (47)$$

Equation (47) must be satisfied for all $\theta$. So it can be written as:

$$4ak_1 - 2BQ^2 - mg = 0 \quad (48)$$

Therefore $$\frac{k_1}{k_2} = 2\left(\frac{b}{a}\right)^2 \quad (49)$$

$$k_1 = \frac{2BQ^2 + mg}{4a} \quad (50)$$

where $B = \frac{2\pi k}{\varepsilon S} = \frac{2\pi k}{aL}$.

From equation (50), $$Q = \sqrt{\frac{4ak_1 - mg}{2B}} \quad (51)$$

In one embodiment, a Finite Element Simulation software (Solidworks® 2016, motion module) was used to establish an element model, and to simulate its vibration isolation performance. A dead load with appropriately designed weight was placed on the top surface of the mechanical metamaterial unit cell 26 and an excitation of vibration in a frequency range of [0.1 Hz, 25 Hz] was applied on its bottom surface. The input and output displacement, recorded on the bottom and top surface of the model, respectively, were calculated and compared.

In the example, a genetic algorithm (GA) was performed in Global Optimization Toolbox™ in MATLAB®. The algorithm finds all possible combinations of the design variables to minimize the difference between the total input energy and the change of potential energy of the metamaterial. A prescribed mass of the dead load was 7 kg and the length of the hexagon was 0.09 m.

In the example, the metamaterial framework 14 was fabricated by a 3D printing process. Curable resin was used as the component material to print the framework 14 of the sample and stainless-steel rods were adopted as hinges to joint elements together. Rubber stoppers were installed on each end of rods to keep the hinge not loosened. The springs utilized here were from MiSUMi-VONA, with the model numbers UFSP12-1.2-90 for the primary one and WFSP9-1.2-30 for the secondary one.

The vertical and horizontal experimental setup of the example is shown in FIGS. 10A and 10E, respectively. In the vertical experiment, one metamaterial unit cell 26 was installed on an electromechanical shaker (S 51120 from TIRA vibration Test Systems Inc.). The payload 18 was appropriately adjusted by standard weights and is attached on the surface of the metamaterial framework 14. Two identical accelerators (352C33 from PCB Piezotronics Inc.) were attached on the top and bottom surfaces of the metamaterial framework 14, just locating at the excited and output positions, respectively. In the horizontal experiment, the payload 18 (a cart with wheels to reduce the influence of friction) was connected by two horizontal shakes (the right one: S 51120 from TIRA vibration Test Systems Inc., the left one: ET-139 from Labworks Inc.). Three acceleration meters (two of them: 352C33 from PCB Piezotronics Inc. the remainder: 356A25 from PCB Piezotronics Inc.) were attached on excited positions and the payload 18. The random/sweep signal(s) were generated by the signal generating module included in dynamic signal collecting system (LabGenius IM1208H from inter-Measure, Inc.), and then amplified by power amplifiers (BAA 120 from TIRA vibration Test Systems Inc. & pa-138 from Labworks Inc.). The acceleration signals were measured and directly acquired by the dynamic signal collecting system.

Although aspects have been described in detail with reference to certain preferred embodiments, variations and modifications exist within the scope of one or more independent aspects as described.

What is claimed is:

1. A metamaterial system for protecting a payload from external energy flux generated by an energy source, wherein the external energy flux is a mechanical vibration, the metamaterial system comprising:
   a mechanical, metamaterial framework configured to circulate the external energy flux between the metamaterial system and the energy source, wherein the framework includes a unit cell having a plurality of outer inelastic elements pivotally coupled to one another at pivot points, wherein the plurality of outer inelastic elements define an outer periphery of the unit cell, wherein the framework additionally includes a plurality of inner inelastic elements, wherein each of the inner inelastic elements includes a first end coupled to one of the pivot points and a second end spaced inwardly from the one of the pivot points, wherein the framework additionally includes a first elastic element coupled to and extending between two of the pivot points, and a second elastic element coupled to and extending between two of the second ends, wherein the first elastic element extends parallel to the second elastic element.

2. The metamaterial system of claim 1, wherein the external energy flux is configured to be stored in the first and the second elastic elements and then released and returned back to the energy source.

3. The metamaterial system of claim 2, wherein each of the first and the second elastic elements includes at least one of a spring, a rubber band, or an elastic rod.

4. The metamaterial system of claim 1, wherein the plurality of outer inelastic elements include rigid bars.

5. The metamaterial system of claim 1, wherein the unit cell is one of a plurality of multiple unit cells that are assembled in an array.

6. The metamaterial system of claim 1, further comprising the payload, wherein the payload is coupled to the unit cell, wherein a state of the payload is independent from the external energy flux applied to the unit cell.

7. The metamaterial system of claim 1, wherein the unit cell has absolute zero stiffness.

8. The metamaterial system of claim 1, wherein isolation performance of the unit cell is adjustable in-situ according to a change of loading.

9. The metamaterial system of claim 1, further comprising the payload, wherein the payload is coupled to the unit cell, wherein the unit cell is configured to isolate vibrations in an ultra-low frequency band below 20 Hz for the payload.

10. The metamaterial system of claim 1, wherein the unit cell is configured to isolate vibrations in a full frequency band.

11. The metamaterial system of claim 1, further comprising the payload, wherein the payload is coupled to the unit cell, wherein the unit cell is configured to provide an energy shield for payload.

12. The metamaterial system of claim 11, wherein the unit cell is tunable based on the payload.

13. The metamaterial system of claim 1, wherein the elastic elements have adjustable positions.

14. The metamaterial system of claim 1, further comprising the payload, wherein the payload is disposed within the metamaterial framework.

15. The metamaterial system of claim 1, further comprising the payload, wherein the metamaterial framework is a first metamaterial framework, wherein the metamaterial system further includes a second metamaterial framework, and wherein the payload is disposed between the first and second metamaterial frameworks.

16. The metamaterial system of claim 15, wherein the first and second metamaterial frameworks are identical in size and shape.

17. The metamaterial system of claim 1, wherein the unit cell has a hexagonal outer shape.

18. The metamaterial system of claim 17, wherein the unit cell includes six outer inelastic elements forming the outer hexagonal shape, and wherein pivot points are disposed between the six outer inelastic elements.

19. The metamaterial system of claim 18, wherein the unit cell includes four inner inelastic elements.

20. The metamaterial system of claim 19, wherein the inner inelastic elements have lengths that are shorter than lengths of the six outer inelastic elements that form the outer hexagonal shape.

21. The metamaterial system of claim 1, wherein the first elastic element has a first spring constant and the second elastic element has a second, different spring constant.

* * * * *